US012414895B2

(12) United States Patent
St-Pierre et al.

(10) Patent No.: US 12,414,895 B2
(45) Date of Patent: Sep. 16, 2025

(54) WEIGHT SUPPORT DEVICE AND APPARATUS

(71) Applicant: ORA MÉDICAL INC., Montreal (CA)

(72) Inventors: Louis St-Pierre, Montreal (CA); Yoann Kamdem, Sainte-Cecile-les-Vignes (FR); Guillaume Jones, Montreal (CA); Sarah Lambert, Montreal (CA); Marie-Pier Michaud, Montreal (CA); Samuel Lambert, Sainte-Barbe (CA)

(73) Assignee: ORA MÉDICAL INC., Montreal (CA)

( * ) Notice: Subject to any disclaimer, the term of this patent is extended or adjusted under 35 U.S.C. 154(b) by 92 days.

(21) Appl. No.: 18/569,646

(22) PCT Filed: Jun. 17, 2022

(86) PCT No.: PCT/IB2022/055645
§ 371 (c)(1),
(2) Date: Dec. 13, 2023

(87) PCT Pub. No.: WO2022/264103
PCT Pub. Date: Dec. 22, 2022

(65) Prior Publication Data

US 2024/0261170 A1 Aug. 8, 2024

Related U.S. Application Data

(60) Provisional application No. 63/202,591, filed on Jun. 17, 2021.

(51) Int. Cl.
*A61H 3/00* (2006.01)
*A61H 3/04* (2006.01)

(52) U.S. Cl.
CPC ............... *A61H 3/008* (2013.01); *A61H 3/04* (2013.01); *A61H 2003/007* (2013.01); *A61H 2201/0192* (2013.01); *A61H 2201/163* (2013.01)

(58) Field of Classification Search
CPC .............. A61H 3/008; A61H 2003/007; A63B 22/02–0292
See application file for complete search history.

(56) References Cited

U.S. PATENT DOCUMENTS 8,151,812 B2 * 4/2012 Razon ...................... A61H 3/04 297/195.1
9,914,003 B2 * 3/2018 Kuehne .............. A63B 71/0009
(Continued)

FOREIGN PATENT DOCUMENTS

FR 3021867 B1 6/2019

OTHER PUBLICATIONS

International Search Report; Canadian Intellectual Property Office; International Application No. PCT/IB2022/055645; Sep. 21, 2022; 3 pages.

(Continued)

*Primary Examiner* — Jennifer Robertson
(74) *Attorney, Agent, or Firm* — Taft Stettinius & Hollister LLP

(57) ABSTRACT

A weight support device for use with a walking aid to at least partially support a weight of a user. The weight support device includes an elongated guiding body mountable to the walking aid and having a longitudinal axis extending vertically, a connection body slidably mounted to the elongated guiding body for translating along the longitudinal axis, at least one constant force spring rotatably mounted to the elongated guiding body with an outer end of the spring connected to the connection body, and a body securing device for engagement with the user and mounted to the connection body. When the elongated guiding body is mounted to the walking aid, the spring exerts a restoring
(Continued)

constant force on the connection body when the connection body moves away from the first end of the elongated guiding body.

19 Claims, 26 Drawing Sheets

(56) References Cited

U.S. PATENT DOCUMENTS

| | | | | |
|---|---|---|---|---|
| 2001/0048206 | A1 | 12/2001 | Niu et al. | |
| 2010/0170546 | A1 * | 7/2010 | Popovic | A61H 3/008 135/67 |

OTHER PUBLICATIONS

Written Opinion of the International Searching Authority; Canadian Intellectual Property Office; International Application No. PCT/IB2022/055645; Sep. 21, 2022; 3 pages.

* cited by examiner

WEIGHT SUPPORT DEVICE AND APPARATUS

CROSS REFERENCE TO RELATED APPLICATIONS

This application is a U.S. National Phase of International PCT Application No. PCT/IB2022/055645 filed Jun. 17, 2022, which claims the benefit of U.S. Provisional Patent Application No. 63/202,591 filed Jun. 17, 2021, the contents of each application are incorporated herein by reference in their entirety.

FIELD

The present technology pertains to the field of medical devices for rehabilitation of subjects suffering from locomotor disabilities, and more particularly to weight support devices for walking aids.

BACKGROUND

Rehabilitation allows subjects suffering from locomotor issues to improve their mobility. Usually, the rehabilitation is performed through physical exercises under the supervision of a healthcare professional. However, not all subjects have access to such a healthcare professional or the access they have is limited. To compensate for the limited access to a healthcare professional, walking aids provided with a weight support device have been developed to allow a subject to perform rehabilitation exercises without the help of a healthcare professional. However, most of the weight support devices present at least one of the following disadvantages. do not adequately support the weight of the subject. At least some of the weight support devices do not offer adequate support for rehabilitation, have a design that forces a subject to perform gestures inadequate for rehabilitation, and/or are expensive.

Therefore, there is a need for an improved weight support device.

SUMMARY

According to a first broad aspect, there is provided a weight support device for use with a walking aid to at least partially support a weight of a user, the weight support device comprising: an elongated guiding body extending between a first and a second end along a longitudinal axis and laterally between a front face and a rear face, the elongated guiding body being mountable to the walking aid, the longitudinal axis extending substantially vertically when the elongated guiding body is mounted to the walking aid and the walking aid is positioned on a horizontal surface and the first end being higher than the second end when the elongated guiding body is mounted to the walking aid; a connection body slidably mounted to the elongated guiding body for translating along the longitudinal axis of the elongated guiding body; at least one constant force spring rotatably mounted to the elongated guiding body, an outer end of the at least one constant force spring being connected to the connection body; and a body securing device for engagement with the user, the body securing device being mounted to the connection body, wherein when the elongated guiding body is mounted to the walking aid, the at least one constant force spring exerts a restoring constant force on the connection body when the connection body moves away from the first end of the elongated guiding body so as to compensate at least partially for the weight of the user.

In one embodiment, the connection body is mounted on the front face of the elongated guiding body.

In one embodiment, the at least one constant force spring is mounted at the first end of the elongated guiding body.

In one embodiment, the outer end of the at least one constant force spring is secured to the connection body.

In one embodiment, the outer end of the at least one constant force spring is removably secured to the connection body.

In one embodiment, the elongated guiding body comprises a rail extending along the longitudinal axis and the connection body comprises a trolley slidably mounted to the rail.

In one embodiment, the connection body further comprises a connection plate mounted to the trolley, the outer end of the at least one constant force spring being connected to the connection plate.

In one embodiment, the connection body comprises a joint assembly securable to the body securing device.

In one embodiment, the at least one constant force spring is mounted on the rear face of the elongated guiding body, the weight support device further comprising a connection assembly extending between a first assembly end connected to the connection body and a second assembly end connected to the outer end of the at least one constant force spring, the connection assembly comprising at least a flexible section to engage the first end of the elongated guiding body.

In one embodiment, the elongated guiding body comprises a front rail extending along the longitudinal axis and the connection body comprises a front trolley slidably mounted to the front rail.

In one embodiment, the connection assembly comprises an elongated flexible body connected between the outer end of the at least one constant force spring and the connection body.

In one embodiment, the connection assembly comprises a first connector and a second connector removably securable together, the first connector being connected to the connection body and the second connector being connected to the outer end of the at least one constant force spring.

In one embodiment, the elongated guiding body comprises a rear rail extending along the longitudinal axis and the connection assembly further comprises a rear trolley slidably mounted to the rear rail, the rear trolley being connected to the connection body and the first connector.

In one embodiment, the front trolley comprises a connection plate.

In one embodiment, the connection body comprises a first rotational connection mounted to the connection plate and a second rotational connection mounted to the first rotational connection, the body securing device being mounted to the second rotational connection.

In one embodiment, the at least one constant force spring is mounted adjacent the second end of the elongated guiding body.

In one embodiment, the body securing device comprises a harness.

According to another broad aspect there is provided a walking aid system comprising: a walking aid; and the above-described weight support device, the weight support device being secured to the walking aid so that the longitudinal axis extends substantially vertically when the walking aid is positioned on the horizontal surface.

In one embodiment, the walking aid comprises one of a walker and a treadmill.

In one embodiment, the weight support device offers new perspectives for the rehabilitation of subjects having locomotor disabilities. The weight support offered by a constant force spring provides a more adapted support in comparison to a usual spring and the contact force spring may be adapted based on the progress of the subject in the rehabilitation. The present weight support device allows for replicating the support provided by a healthcare professional to continue the rehabilitation outside a rehabilitation center or clinic. The present weight support device also allows for a healthcare professional to follow up the rehabilitation of a subject and the follow-up can be performed remotely.

In one embodiment, the weight support device is integrated into a walking aid such as a wheeled walker, powered walker or the like. In one embodiment, a walking aid consists of an assistive device that intends to improve the walking pattern of a user. It reduces the weight bearing on affected or injured limbs and transfers the weight to the device, thereby reducing the pain suffered by the user and improving the user's ability to walk. The use of a walking aid also improves the balance of the user while walking by increasing the base of support. An example of a walking aid consists in a walker which usually comprises a frame and four points of contact with the ground.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Figure 1:
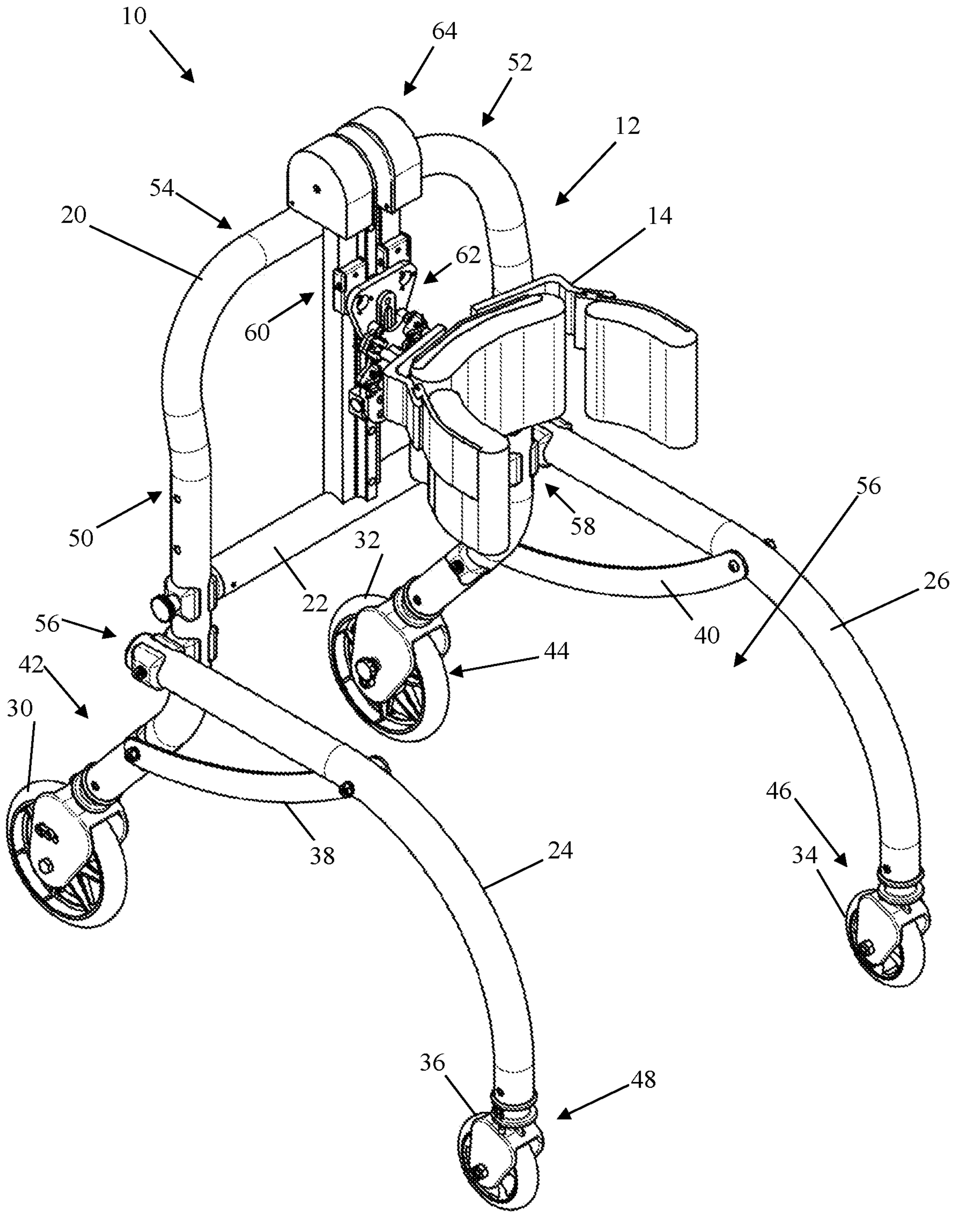
FIG. 1 is a perspective view of a walker provided with a weight support device and a harness, in accordance with a first embodiment.

FIG. 1 illustrates one embodiment, a walker 10 provided with a weight support device 12 and a harness 14. It should be understood that the illustrated walker 10 is exemplary only and the weight support device 12 can be used in connection with any other adequate walker, any adequate walking aid, any adequate treadmill or the like.

The exemplary walker 10 comprises a U-shaped bar or rod 20, a transverse bar 22, two curved bars 24 and 26, four wheels 30, 32, 34 and 36 and two reinforcement arms 38 and 40. The wheels 30 and 32 are rotatably secured to a respective end 42, 44 of the U-shaped bar 20 while the wheels 34 and 36 are rotatably secured to a first end 46, 48 of a respective curved bar 24, 26.

As illustrated in FIG. 1, the U-shaped bar 20 comprises two arm portions 50 and 52 each rotatably secured to a respective wheel 30, 32 and spaced apart by a central portion 54. A second end 56 of the curved bar 24 is secured to the arm portion 50 of the U-shaped bar 20 and a second end 58 of the curved bar 26 is secured to the arm portion 52 of the U-shaped bar 20. The transverse bar 22 is secured to the two arm portions 50 and 52 of the U-shaped bar 20 and extends therebetween. The reinforcement bar 38 extends between a first end secured to the arm portion 50 of the U-shaped bar 20 and a second end secured to the curved arm 24. The reinforcement bar 40 extends between a first end secured to the arm portion 52 of the U-shaped bar 20 and a second end secured to the curved arm 26.

In the following, the space 56 between the curved bars 24 and 26 and the U-shaped bar 20 in which the harness 14 is positioned is referred to as the receiving space, i.e., the space for receiving a user of the walker 10.

The weight support device 12 is secured to the walker 10, and more precisely to the transverse bar 22 and the central portion 54 of the U-shaped bar 20 of the walker 10, as described in greater detail below.

The weight support device 12 comprises an elongated guiding structure or body 60 secured to the walker 10, a connection structure or body 62 and two spring assemblies 64. The elongated guiding structure 60 is fixedly secured to the transverse bar 22 and the central portion 54 of the U-shaped bar 20 and extends therebetween. The connection structure 62 is secured to the harness 14 and slidably connected to the elongated guiding structure 60. Each spring assembly 64 is fixedly secured to the top portion of the elongated guiding structure 60 and comprises two constant force springs that are operatively connected to the connection body 62 to each exert a constant restoring force on the connection structure 62 while they are extended due to the motion of the connection structure 62 away from the spring assembly 64.

Figure 2:
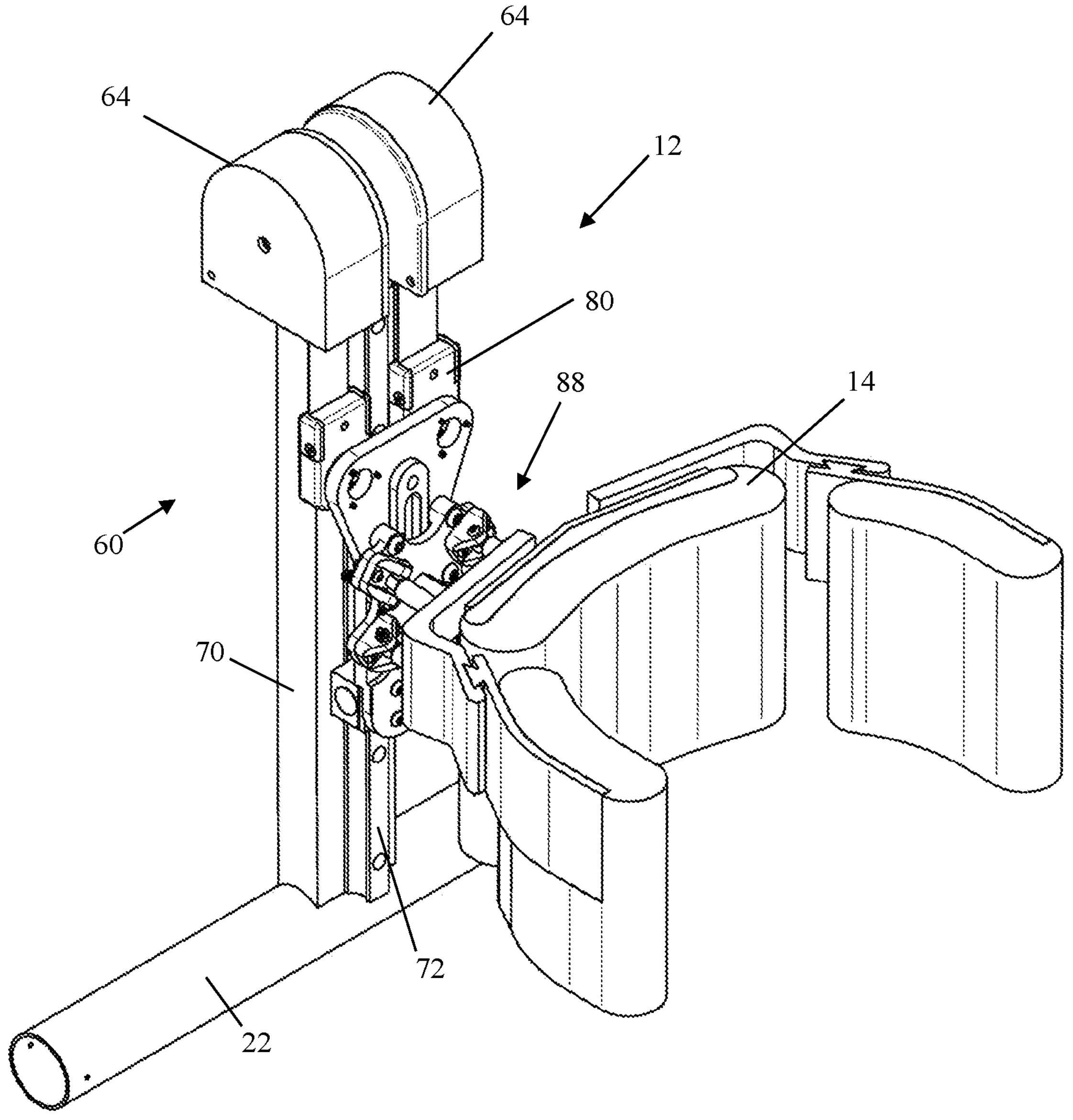
FIG. 2 is a perspective view of the weight support device and the harness of FIG. 1, the weight support device comprising an elongated guiding structure, a connection structure and a spring assembly.
Figure 3:
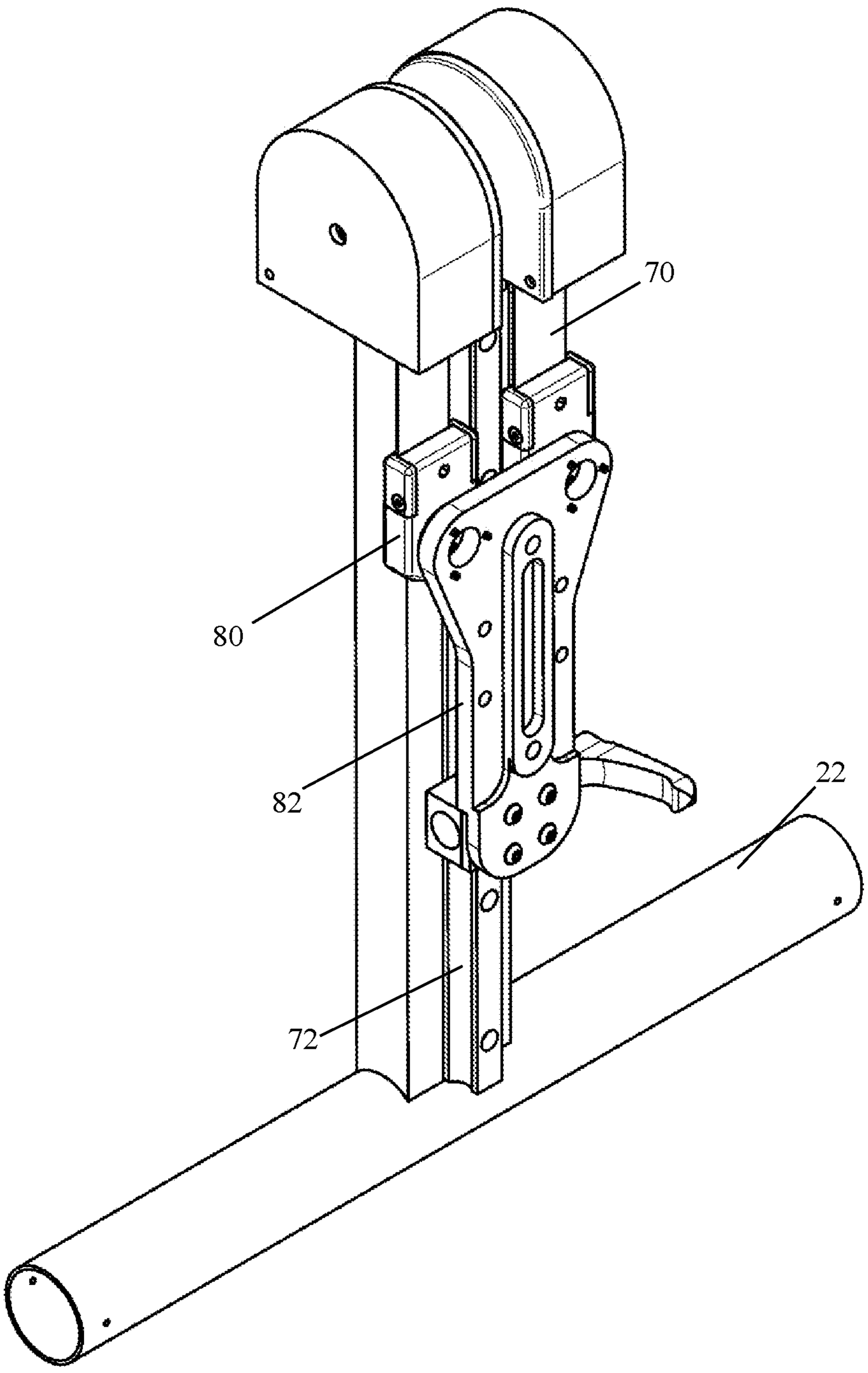
FIG. 3 is a perspective view of the elongated guiding structure and part of the connection structure of the weight support device of FIG. 1.

As illustrated in FIGS. 2 and 3, the elongated guiding structure 60 comprises a main elongated body 70 having the shape of a rod or tube, and a rail 72. The main elongated body 70 extends longitudinally between a first or top end and a second or bottom end. The bottom end of the main elongated body 70 is fixedly secured to the transverse bar 22 of the walker 10 and the top portion of the main elongated body 70 is secured to the central portion 54 of the U-shaped bar 20. The main elongated body 70 comprises a front face that faces the receiving space 56 and a back face opposite the front face. The rail 72 is fixedly secured to the front face and extends along at least a section thereof.

Figure 4:
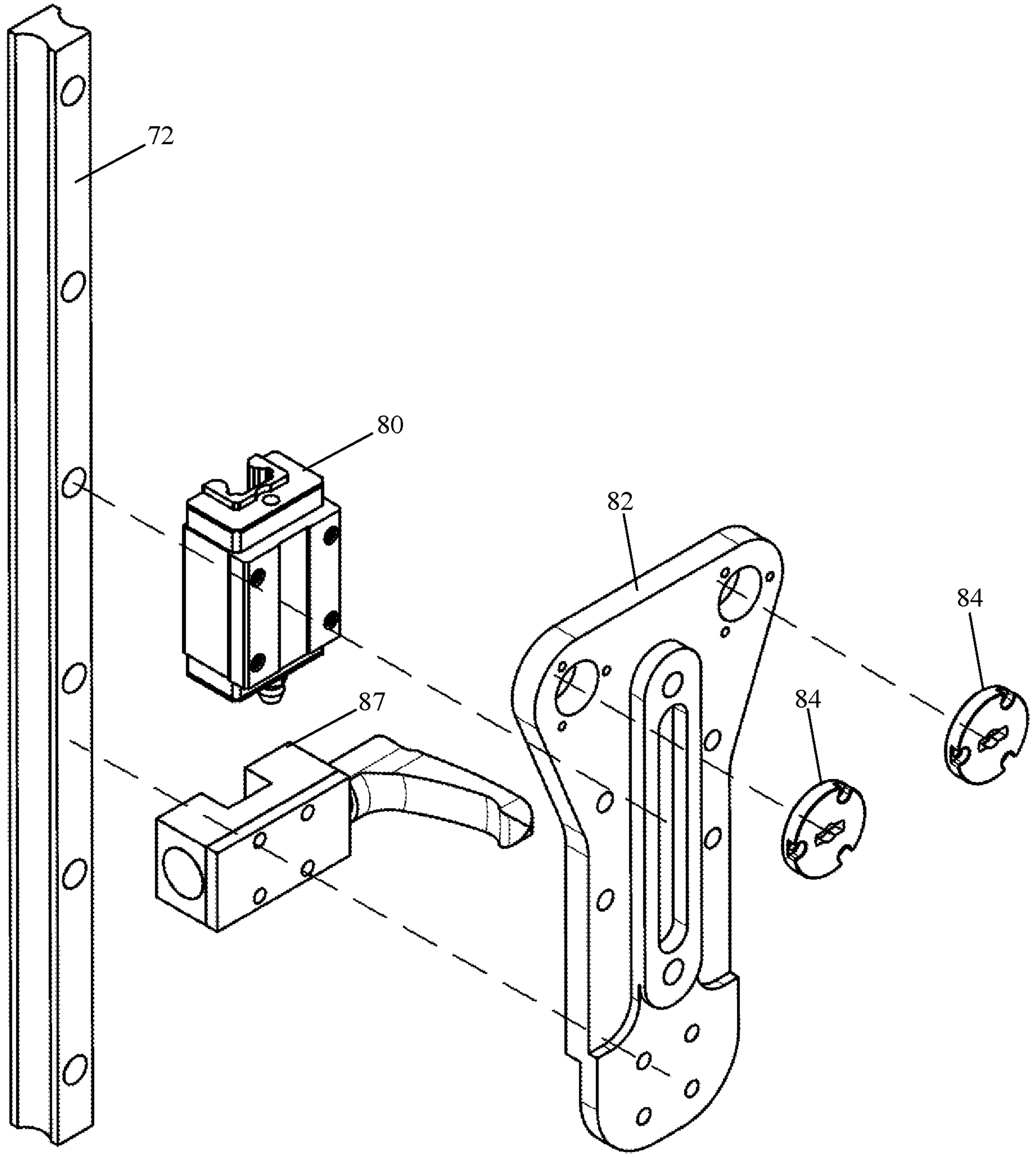
FIG. 4 is a perspective exploded view of the part of the elongated guiding structure and part of the connection structure of the weight support device of FIG. 1.

As illustrated in FIGS. 2-4, the connection structure 62 comprises a trolley 80, a connection plate 82, two connectors 84 and a ball joint assembly 88. The trolley 80 is operatively connected to the rail 72 so as to allow a translation of the trolley 80 along the rail 72. The person skilled in the art will understand that the design of the trolley 80 and the design of the rail 72 may vary as long as a single degree of freedom exists between the rail 72 and the trolley 80, i.e. as long as the trolley 80 can only translate along the rail 72. In the illustrated embodiment, the rail 72 is provided with a recess extending along each one of its lateral faces and the trolley 80 is provided with a U-shaped cross-section. Protrusions that match the recesses of the rail 72 are provided on opposite internal faces of the trolley 80 and when the trolley 80 is connected to the rail 72, each protrusion of the trolley 80 is inserted into a respective recess of the rail, thereby allowing only a translation of the trolley along the rail 72.

The connection plate 82 is secured to the trolley 80. It will be understood that any adequate securing means for securing the connection plate 82 to the trolley 80 may be used. In one embodiment, the connection plate 82 is removably secured to the trolley 80. For example, screws may be used for securing the connection plate 82 to the trolley 80. In another embodiment, the connection plate is fixedly secured to the trolley 80.

The connection plate 82 is provided with two holes or apertures 86 which are located adjacent to a top end of the connection plate 82. As described in greater detail below, the holes 86 are used for securing the constant force springs to the connection plate 82.

In one embodiment, the weight support device 12 further comprises a brake trolley 87 of which the position along the rail 72 can be fixed. Similarly to trolley 80, trolley 87 is operatively connected to the rail 72 so as to only allow a translation of the trolley 87 along the rail 72. In the illustrated embodiment, trolley 87 is provided with a U-shaped cross-section. Protrusions that match the recesses of the rail 72 are provided on opposite internal faces of the trolley 87 and when the trolley 87 is connected to the rail 72, each protrusion of the trolley 80 is inserted into a respective recess of the rail, thereby allowing only a translation of the trolley 87 along the rail 72. The trolley 87 further comprises a brake mechanism that when activated prevents the trolley 87 from translating along the rail 72. In order to limit the translation of the trolley 80 along the rail 72, the trolley 87 can be positioned at a desired position along the rail 72 and the brake mechanism is actuated so as to fix the trolley at the desired position by preventing any translation of the trolley 87 along the rail 72. The fixed position of the brake trolley along the rail 72 then limits the possible translation of the trolley 80 along the rail 72 by defining an extreme possible position for the trolley 80.

Figure 5:
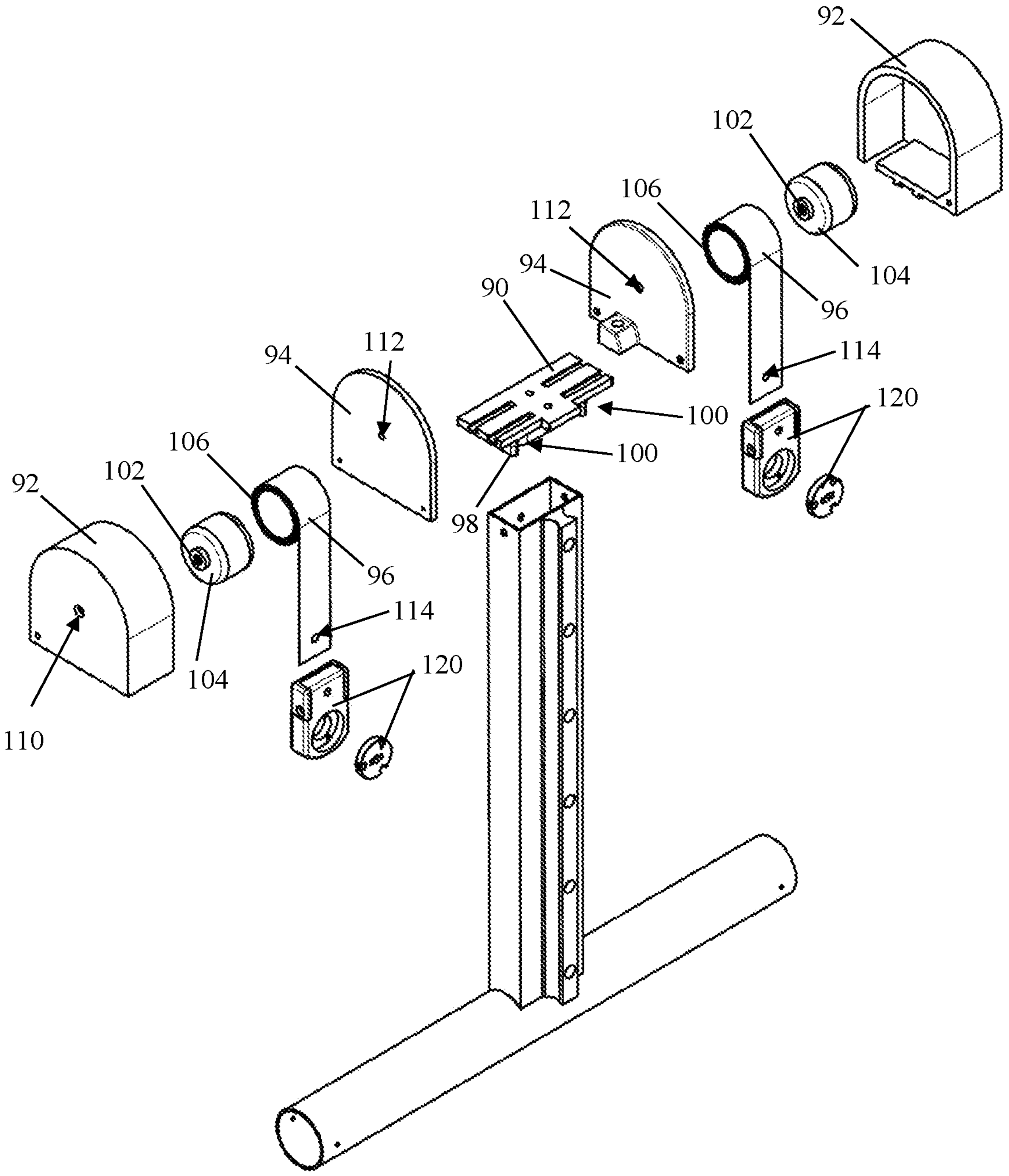
FIG. 5 is a perspective exploded view of the spring assembly of the weight support device of FIG. 1.

FIG. 5 illustrates one embodiment of a spring assembly 64. A spring assembly 64 comprises a base plate 90, a casing 92, a cover plate 94 and two constant force springs 96. It will be understood that in the illustrated embodiment, the two spring assemblies 64 illustrated in FIG. 2 share the same base plate 90. Additionally, only one spring assembly 64 can be mounted on the single base plate 90 if a weaker restoring force is required for a specific patient.

The base plate 90 is securable to the top end of the elongated body 70. In the illustrated embodiment, the elongated body 70 is hollow and the base plate 90 comprises a protrusion 98 that projects form a bottom face thereof. The protrusion of the base plate 90 snuggingly fits into the hollow elongated body 70 so as to secure the base plate to the elongated body 70. It will be understood that any adequate means for securing the base plate 90 to the elongated body 70 may be used. For example, adhesive, screws, etc. may be used for securing the base plate 90 to the elongated body 70.

The base plate 90 is further provided with two recesses 100 in which at least the outer end of the constant force spring 96 may extend.

The constant force spring 96 is mounted on a shaft 102 for rotatably securing the constant force spring 96 to the casing 92 and the cover plate 94. A tubular spacer 104 is mounted about the shaft 102 and a bearing 106 is mounted about the spacer 104. The constant force spring 96 is mounted about the bearing 106. The casing 92 is provided with a first aperture 110 on a lateral face thereof and the cover plate 94 is provided with a second aperture 112. The apertures 110 and 112 are designed so as to each receive a respective end of the shaft 102 so as to rotatably secure the constant force spring 96 to the casing 92 and the cover plate 94, and therefore to the elongated guiding structure 60.

The constant force spring 94 comprises a wound or coil section connected to a flat outer end. A constant force spring usually consists of a pre-stressed flat strip of spring material which is formed into substantially constant radius coils around itself or on a drum. When the strip is extended (deflected) the inherent stress resists the loading force, the same as a common extension spring, but at a nearly constant (zero) rate. A substantially constant torque is then obtained when the outer end of the spring is extended. It should be understood that the rotation axis about which the constant force spring 94 rotates is chosen so as to be orthogonal to the longitudinal axis of the rail 72 so that when the constant force spring 94 is unrolled, the outer end of the constant force spring 94 moves along a linear axis that is parallel to the rail 72. As illustrated in FIG. 5, the outer end of the constant force spring 94 is provided with an aperture 114 for securing the outer end of the constant force spring 94 to an adapter 120. In one embodiment, the adapter 120 is removably secured to the outer end of the constant force spring 94.

The adapter 120 connects to the outer end of the constant force spring 96 through a hole in the constant force spring 96, and is secured with a screw. The securing means 84 is a rotating securing device, such as a quick connect adapter, which aligns a spring-loaded pin with the hole in the adapter 120. When the pin and hole are aligned, the spring is released, thereby locking the securing means 84 to the adapter 120. The user makes a rotating movement of the securing means 84 to align the pin with the hole. The securing means 84 is joined to the plate 82 with screws.

While in the illustrated embodiment, the constant force spring 96 is rotatably secured to the casing 92 and the cover plate 94 via the shaft 102, the spacer 104 and the bearing 106, other embodiments may be possible as long as the constant force spring 96 is rotatably mounted relative to the elongated guiding structure 60.

Figure 6:
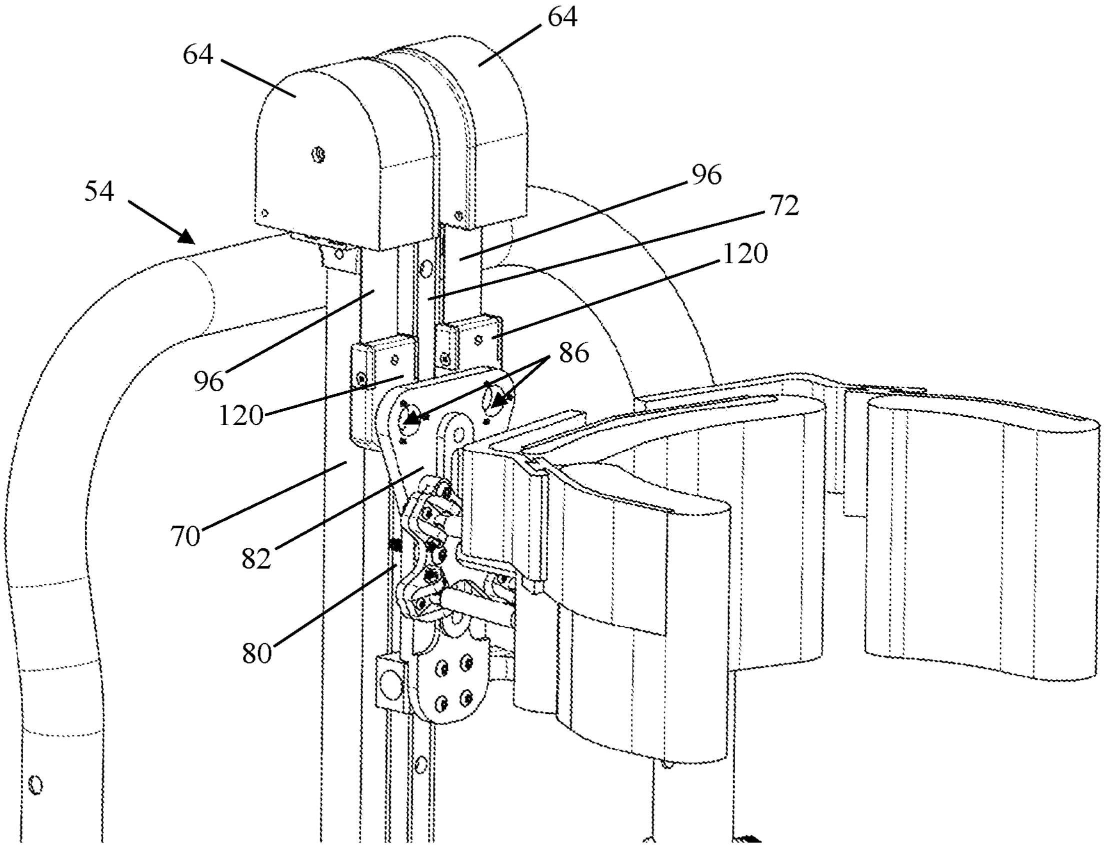
FIG. 6 is a perspective view of the spring assembly, part of the elongated guiding structure and the connection structure of the weight support device of FIG. 1.

Referring to FIG. 6, there is illustrated the two constant force springs 96 when secured to the connection structure 62. Each adapter 120 to which the outer end of a respective constant force spring 96 is secured is removably secured to the connection plate 82 using the securing means 84.

Figure 7A:
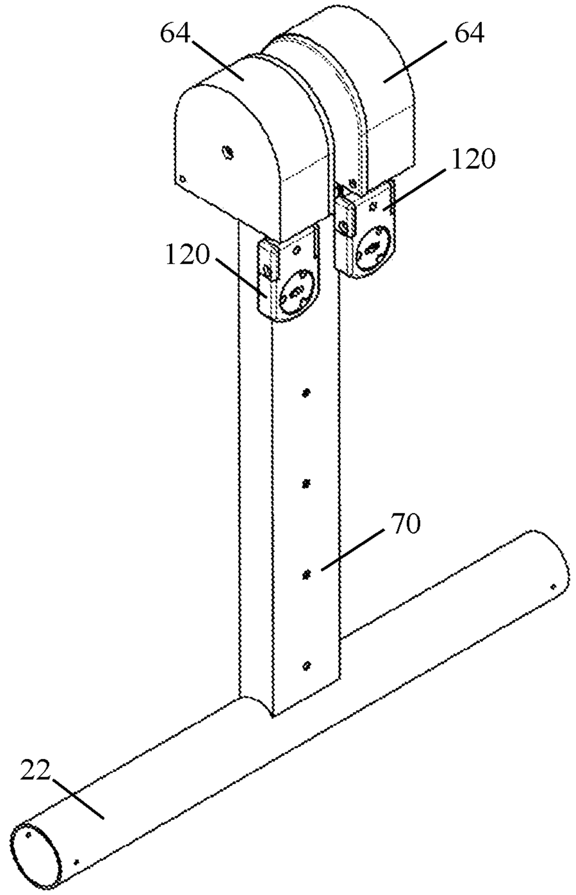
FIGS. 7*a* and 7*b* illustrate two springs of the spring assembly contained in the weight support assembly of FIG. 1 in a retracted position and an extended position, respectively, in accordance with an embodiment.
Figure 7B:
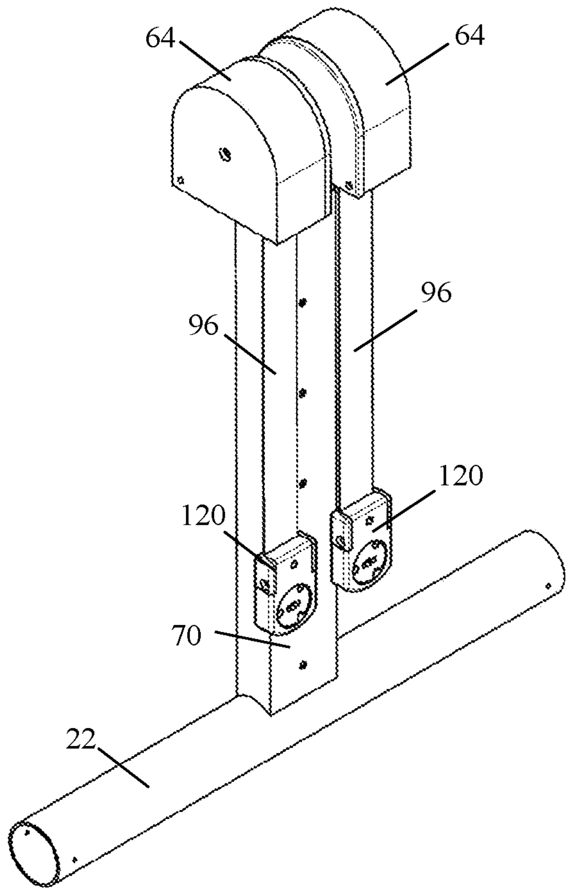

As a result of the securing of the outer ends of the constant force springs 96 to the connection structure 62, a displacement of the connection structure 62 along the rail 72 away from the spring assemblies 64 exerts a force on the constant force springs which unroll or uncoil. The uncoiling of each constant force spring 96 generates a restoring force on the connection plate 82 in a direction opposite to the displacement of the connection structure 62, i.e., the restoring force is directed towards the spring assemblies 64, as illustrated in FIGS. 7 and 7*b*. It should be understood that in FIGS. 7*a* and 7*b*, the connection structure 62 and the rail 72 are omitted to better see the constant force springs 96. In FIG. 7*a*, the two constant force springs 96 are in a retracted position. In the retracted position, no downward force is exerted on the connection structure 62 and the distance between the adapters 120 and the casing 92 of its respective spring assembly 94 is minimal. FIG. 7 *b* illustrates the constant force springs 96 when a downward force is exerted on the connection structure 62. As a result of the downward force exerted on the connection structure 62, the connection structure 62 translates along the rail 72 away from the spring assemblies 64. Since the adapters 120 are secured to the connection structure 62, the downward force is transmitted to the adapters 120 and the adapters 120 also translate away from the spring assemblies 64. Since the outer end of each constant force spring 96 is secured to its respective adapter 120, the translation of the adapters 120 triggers a translation of the outer end of the constant force springs 96 along the elongated guiding structure 60 and therefore an uncoiling of the constant force springs 96. In return, the uncoiling of the constant force springs 96 exerts a restoring force having a direction opposite to that of the downward force on the connection structure 62. The restoring force acts against the downward force and prevents or reduces the downward translation of the connection structure 62 along the rail 72 of the elongated guiding structure 60.

In one embodiment, the adapters 120 and the securing means 84 may be omitted. In this case, the outer end of the constant force springs 96 may be directly secured to the connection plate 82. For example, screws may be used for securing the constant force springs 96 to the connection plate 82. In another example, the constant force springs 96 may be welded to the connection plate 82.

Figure 8:
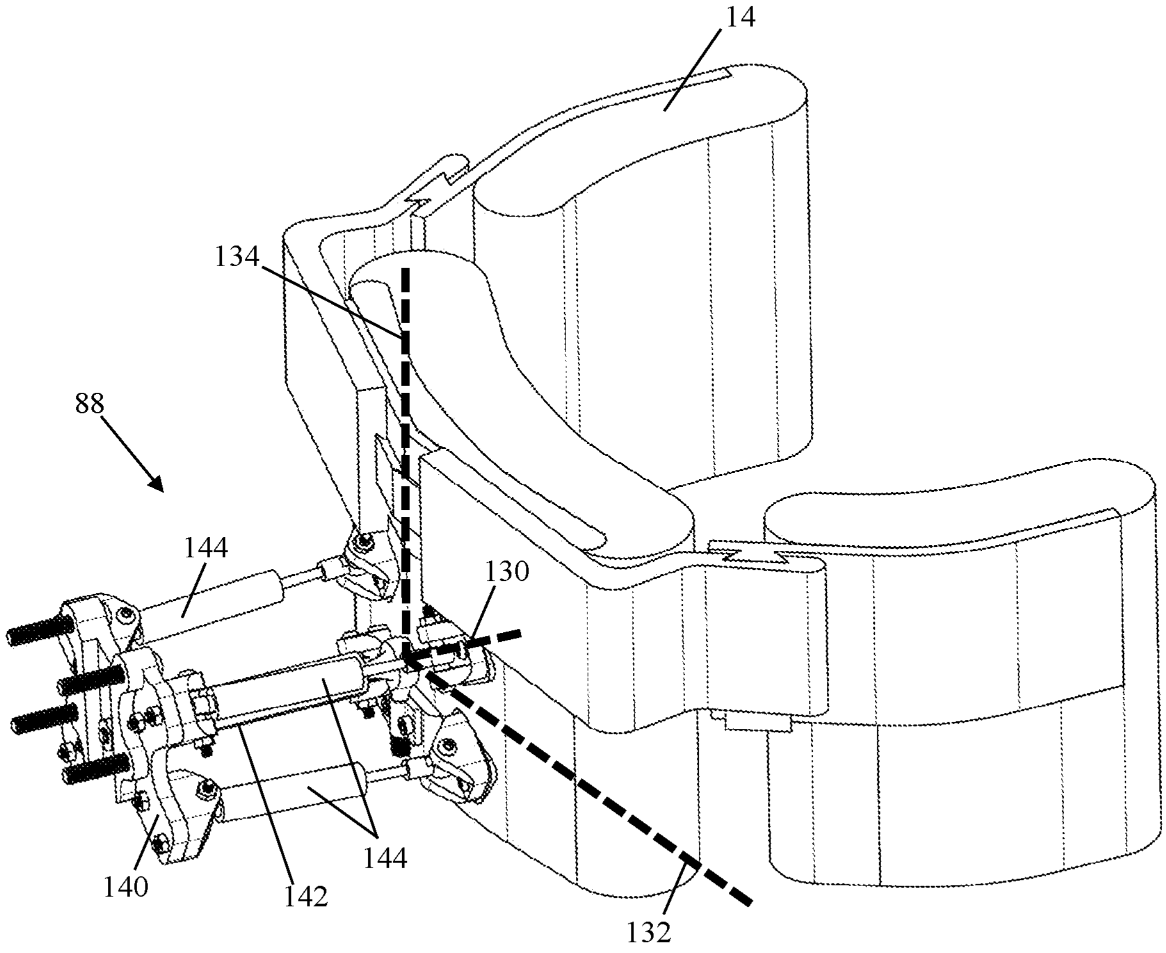
FIG. 8 is a perspective view of part of the connection assembly of the weight support device of FIG. 1 connected to the harness of FIG. 1.
Figure 9:
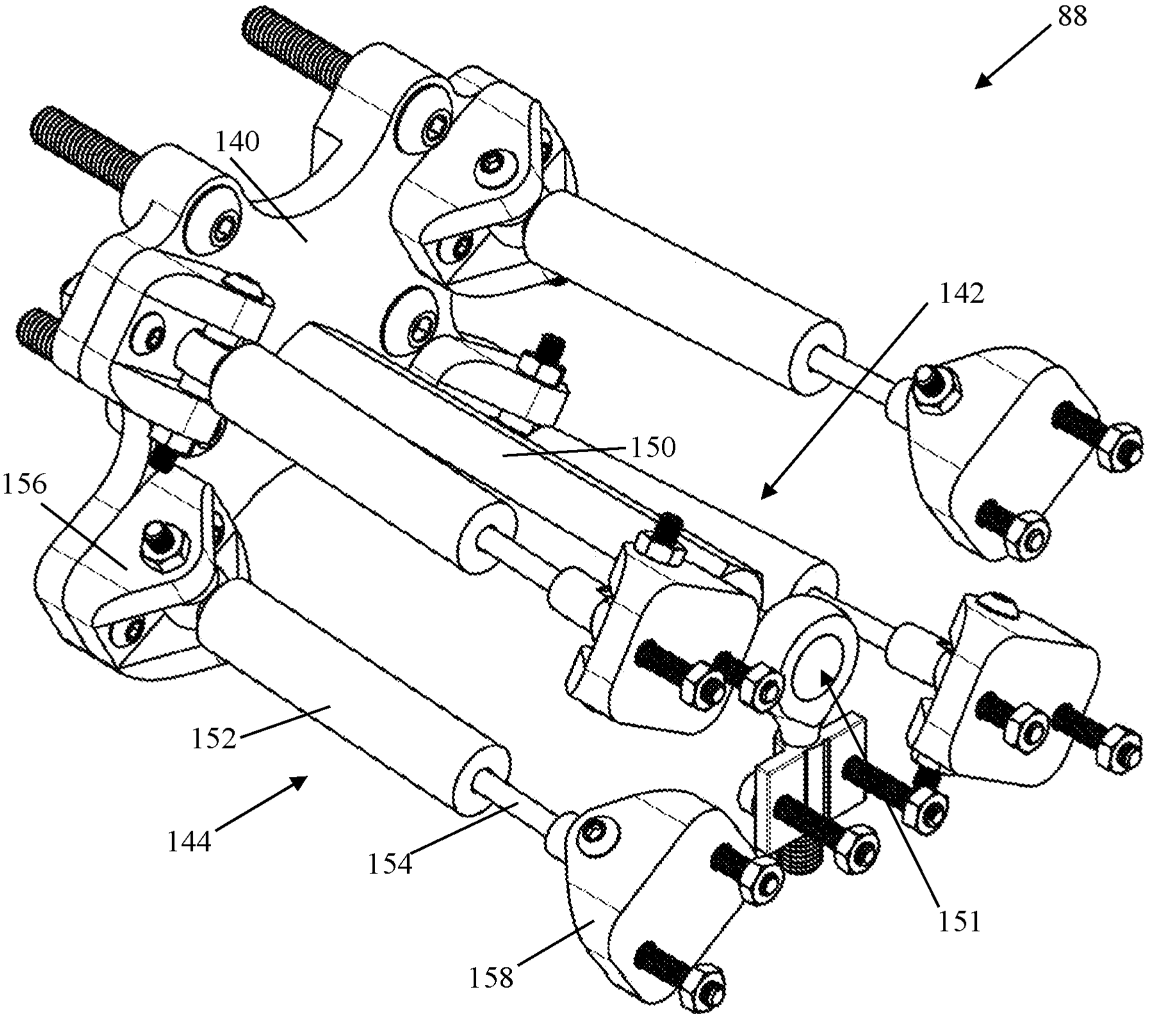
FIG. 9 is a perspective view of a ball joint assembly contained in the connection structure of the weight support device of FIG. 1, in accordance with an embodiment.

As mentioned above, the connection structure 62 further comprises a ball joint assembly 88 for securing the harness 14 to the connection plate 82 of the connection structure 62. FIGS. 8 and 9 illustrate one embodiment of a ball joint assembly 88. As illustrated in FIG. 8, the ball joint assembly 88 allows fora rotation of the harness 14 about three different rotation axes 130, 132 and 134 relative to the connection plate 82. The first rotation axis 130 is orthogonal to the front face of the connection plate 82 of the connection structure 62. The second and third rotation axes 132 and 134 are orthogonal together and parallel to the front face of the connection plate 82.

In the illustrated embodiment, the ball joint assembly 88 comprises a securing plate 140, a central arm 142 and four lateral arms 144. The securing plate 140 is designed to be secured to the connection plate 82 using screws, for example. The central arm 142 is secured to the securing plate 140 substantially at the center thereof. The lateral arms 144 are also secured to the securing plate 140. In the illustrated embodiment, the lateral arms 144 are positioned at different angular positions about the central arm 142. In one embodiment, the angular distance between two adjacent lateral arms 144 is constant so that the lateral arms are angularly equidistant.

As illustrated in FIG. 9, the central arm 142 comprises an elongated body 150 which extends between a first end secured to the securing plate 140 and a second end. A ball joint 151 is rotatably mounted at the second end of the elongated body 150. The length of the central arm 142 is not variable. The ball joint 151 is further fixedly secured to the harness 14, thereby allowing a rotation of the harness 14 about the three rotation angles 130, 132 and 134 relative to the connection structure 62 as illustrated in FIG. 8. In one embodiment, the length of the central arm 142 is fixed.

Each lateral arm 144 comprises an elongated body 152 provided with a cavity 160, a spring 161 a rod 154 partially inserted into the aperture 160, a first pivotal connector 156 and a second pivotal connector 158. The elongated body 152 extends longitudinally between a first end pivotally connected to the first pivotal connector 156 and a second end. The cavity 160 extends longitudinally from the second end of the elongated body 152 towards the first end along a given section of the length of the elongated body 152. The spring 161 is inserted into the cavity 160.

The rod 154 extends longitudinally between a first end inserted into the cavity 160 of the elongated body 152 and abutting the spring 161, and a second end pivotally connected to the second pivotal connector 158. The first end of the rod 154 may translate within the cavity 160 of the elongated body 152. The translation of the rod 154 into the cavity compresses the spring 161. When the spring 161 achieves its maximal compression, the rod 154 can no longer translate into the cavity 160.

The first pivotal connector 156 is fixedly secured to the securing plate 140 such as using screws and the second pivotal connector 158 is fixedly secured to the harness 14. The first pivotal connector 156 allows for a rotation of the elongated body 152 relative to the first pivotal connector 156 about a first rotation axis and the second pivotal connector 158 allows for a rotation of the rod 154 relative to the second connector 158 about a second rotation axis that is parallel to the first rotation axis of the first pivotal connector 156.

The four lateral arms 144 allows for limiting the rotation of the harness 14 relative to the securing plate 140 while maintaining the harness 14 in a rest position when not in use. When the harness 14 is rotated relative to the securing plate 140, the rod 154 of at least one lateral arm 144 translates within the cavity 160 of its respective elongated body 152 towards its respective first pivotal connector 156 and/or the rod 154 of at least another lateral arm 144 translates within the cavity 160 of its respective elongated body 152 away from its respective first pivotal connector 156. Within each cavity 160 of its respective elongated body 152, a spring 161 provides a force opposed to the movement of the corresponding lateral arm 144. Therefore, a force is applied against the rotation of the harness 14 relative to the securing plate 140. This force increases as the angle of rotation from the original position of the harness 14 relative to the securing plate 140 increases. While the harness 14 is being rotated relative to the securing plate 140 and when a spring 161 reaches its maximal compression, the rotation of the harness is stopped since a rod 154 can no longer translate within the cavity of its elongated body 152. Therefore, the four lateral arms 144 act as a limiting device for limiting the rotation of the harness 14 relative to the securing plate 140, and therefore to the elongated guiding structure 60, about any rotation axis 130, 132, 134. Furthermore, when no force is exerted on the harness 14, the springs 161 bias the rods 154 into a rest position relative to the cavities 160, and therefore bias the harness 14 into a rest position. In one embodiment, the rest position for the harness 14 is chosen so as to be a straight position to facilitate the installation of the harness 14 on a user.

Each pivotal connector 156 and pivotal connector 158 is positioned at an equal distance from the axis of the elongated body 150. This distance is calculated to permit a maximum rotation between the harness 14 and the securing plate 140, considering the length of the cavity of the elongated body 152. The pivotal connector 156 and pivotal connector 158 are oriented such that each lateral arm 144 rotates directly towards or away from the axis of elongated body 150.

While the illustrated embodiment, the ball joint assembly 88 comprises four lateral arms 144 for limiting the rotation of the harness relative to the elongated guiding structure 60, it should be understood that the number of lateral arms 144 may vary as long as the ball joint assembly 88 comprises at least three lateral arms 144. Similarly, it should be understood that the position of the lateral arms 144 relative to the central arm 142 may vary and/or the orientation of the rotation axis of the first pivotal connector 156 relative to the position of the central arm 142 may vary.

It should be understood that the lateral arms 144 are exemplary only and may be replaced with any adequate device or structure that limits the amplitude of the rotation of the harness relative to the plate 140 about at least one rotational axis.

It should also be understood that the lateral arms 144 may be omitted.

While in the illustrated embodiment it is mounted so that the ball joint 151 be mounted on the harness 14, the ball joint assembly 88 may be reversely mounted, i.e., the central arm 142 may be mounted between the plate 140 and the harness 14 so that the ball joint be rotatably secured to the plate 140 and the elongated body 150 be secured to the harness 14.

Figure 10:
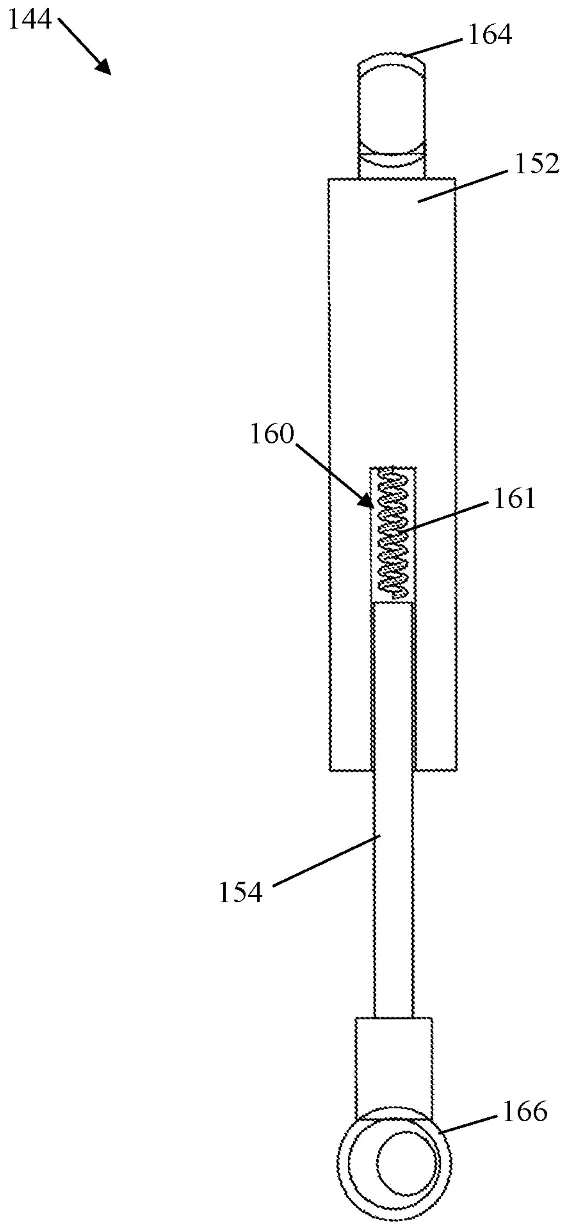
FIG. 10 is a cross-sectional view of an arm contained in the ball joint assembly of FIG. 9.
Figure 11:
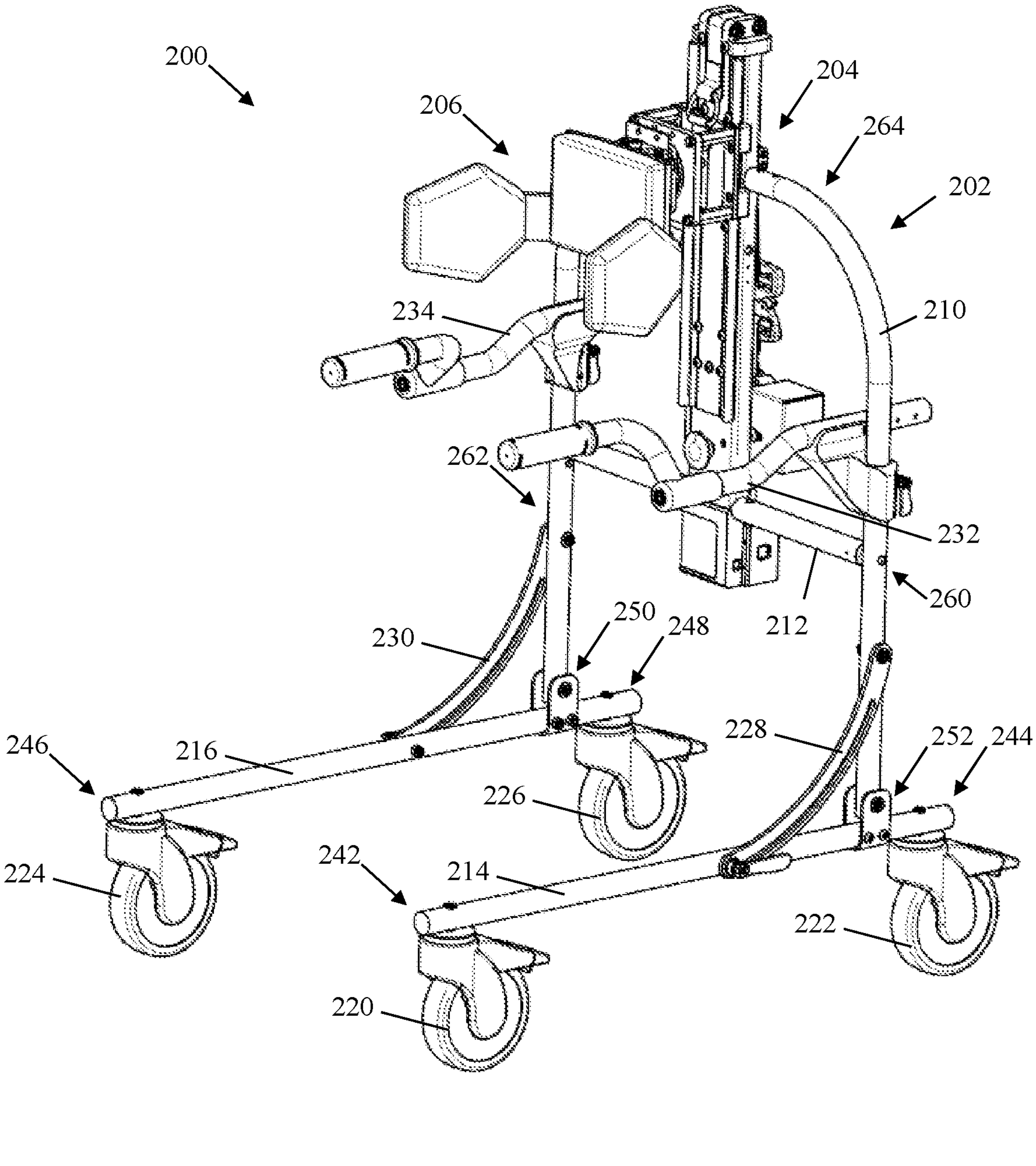
FIG. 11 is a front perspective view of a walker provided with a weight support device and a harness, in accordance with a second embodiment.
Figure 12:
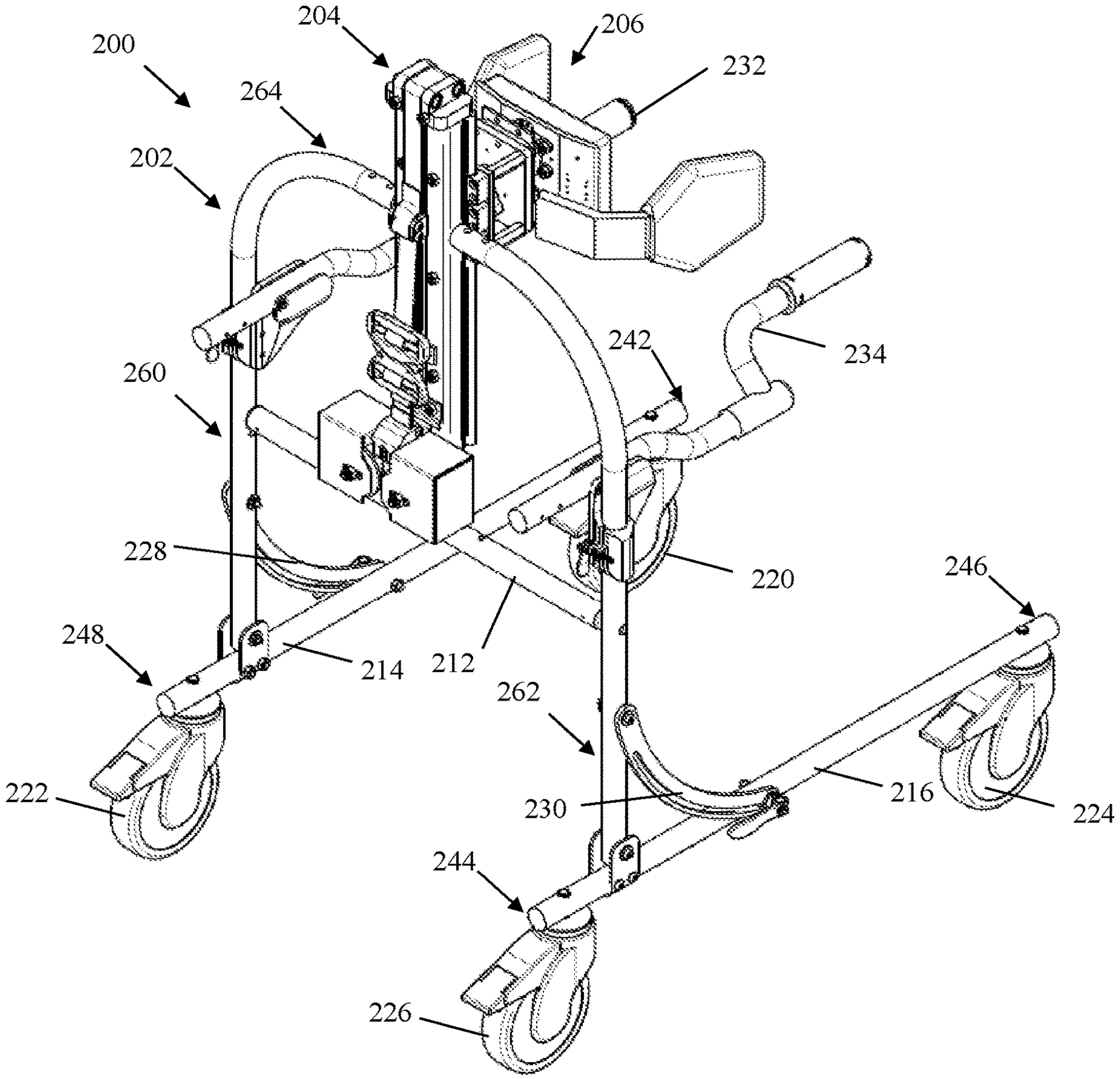
FIG. 12 is a rear perspective view of the walker of FIG. 11.
Figure 13:
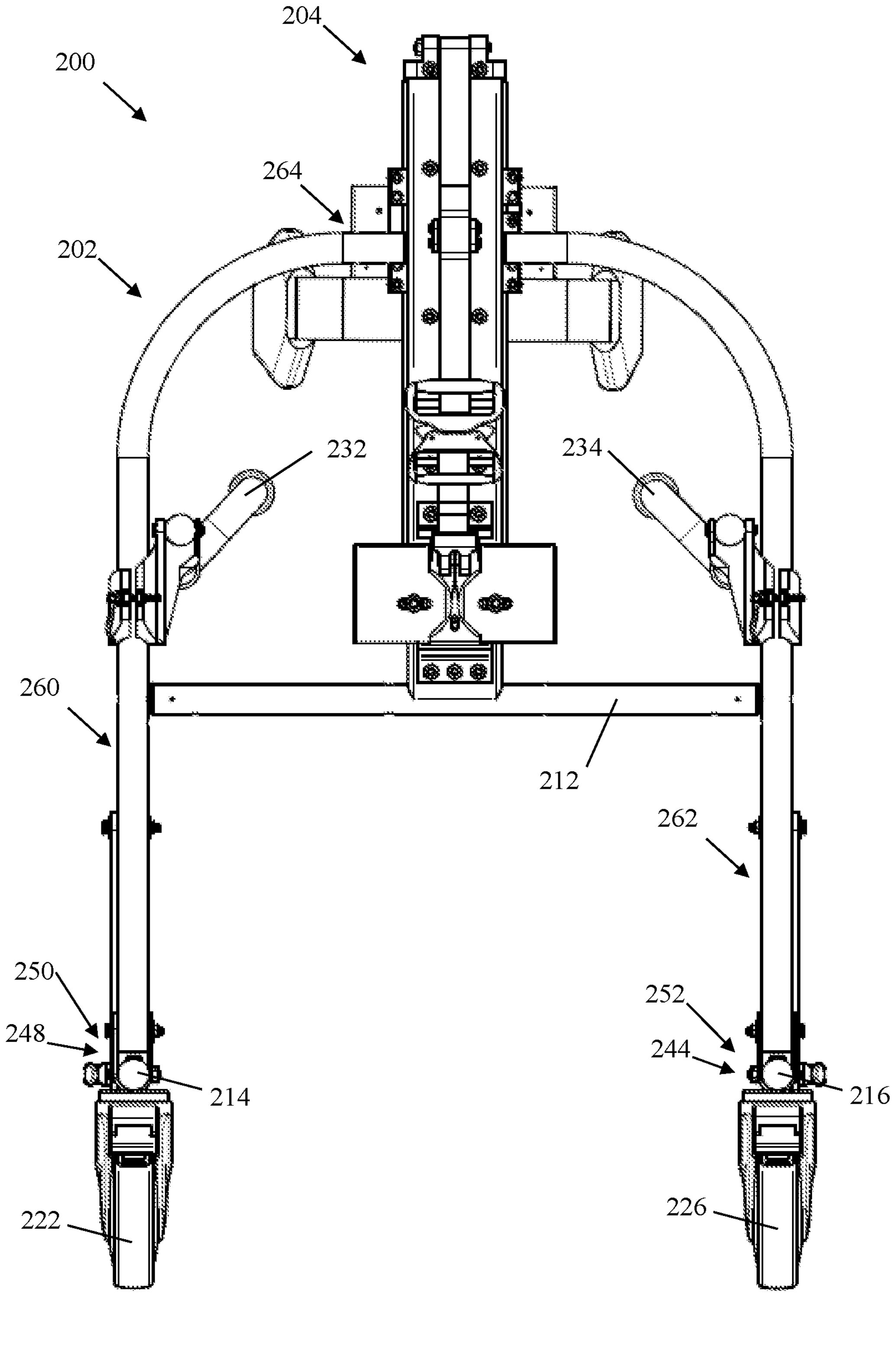
FIG. 13 is a rear view of the walker of FIG. 11.
Figure 14:
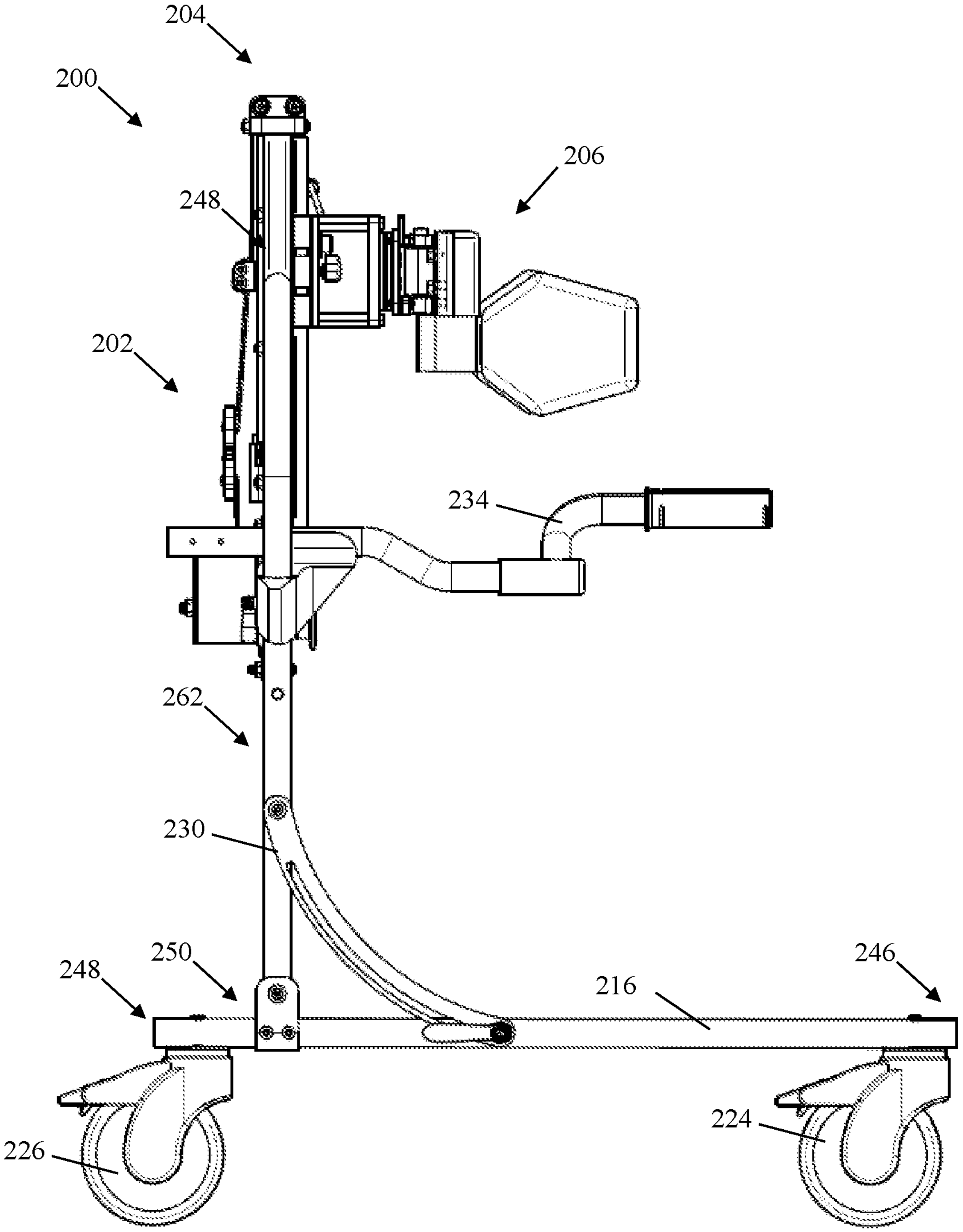
FIG. 14 is a left view of the walker of FIG. 11.
Figure 15:
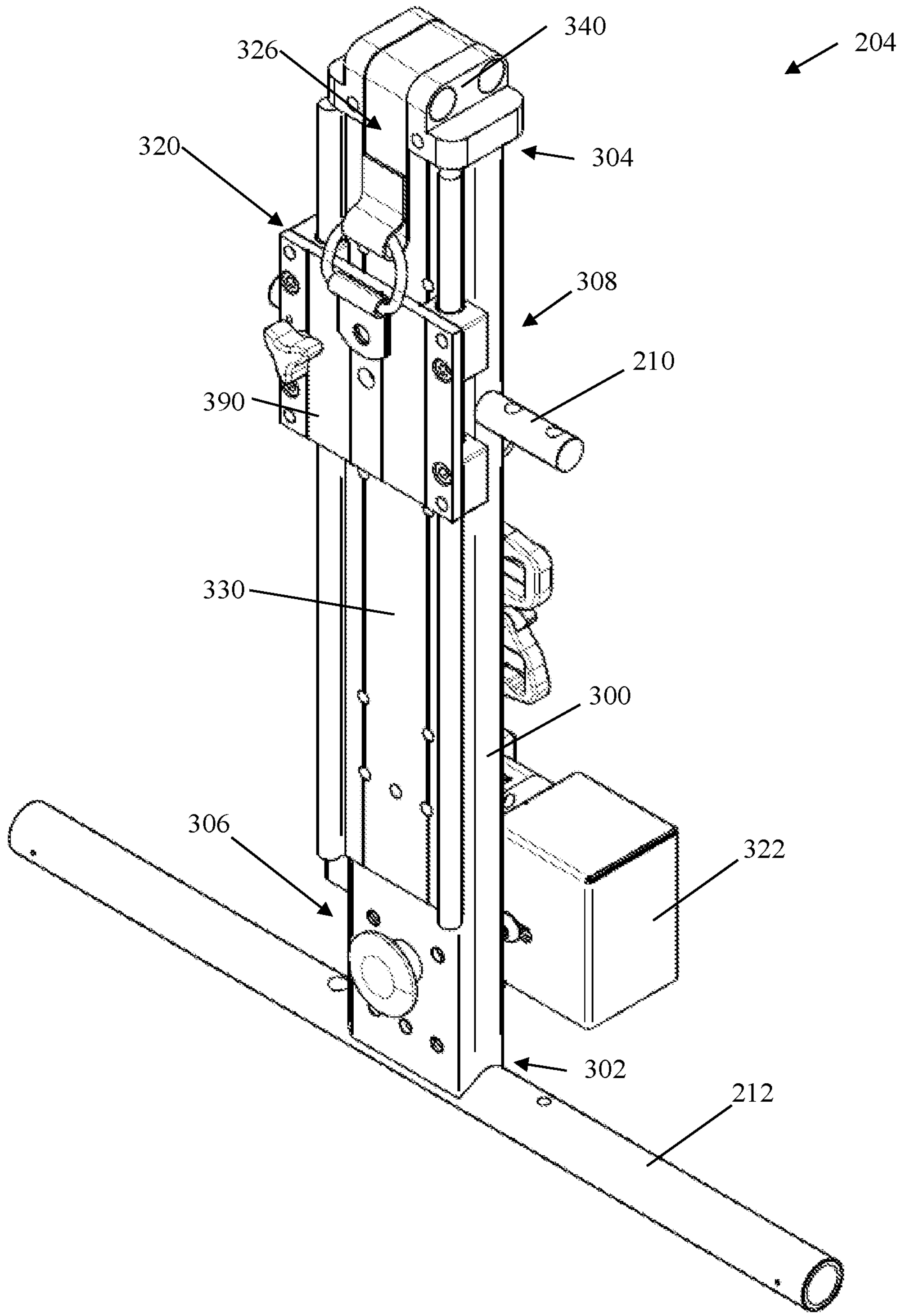
FIG. 15 is a front perspective view of the weight support device of the walker of FIG. 11 in a rest position.

As illustrated in FIG. 10, a first connection head 164 is mounted to the proximal end of the elongated body 152 and a second connection head 166 is mounted at the distal end of the rod 154. The first and second connection heads 164 and 166 are each provided with an aperture in which a pin is to be inserted for rotatably securing the first connection head 164 to a first pivotal connector 156 and the second connection head a respective second pivotal connector 158, respectively.

In one embodiment, the harness 14 comprises a rigid structure, such as metal structure, and foam pads, such as memory foam pads, are secured. The harness 14 is designed for gripping a user at the pelvis. Two straps covered with memory foam pads are attached to the metal structure and hang beneath the user so as to provide pelvic support. The straps are linked both to the front of the harness 14 and to the rear of the harness 14. At least two additional straps covered with foam pads may be passed in front of the user to provide trunk support. The straps are linked from the right side of the harness 14 to the left side of the harness 14.

While the illustrated ball joint assembly 88 offers three rotational degrees of freedom between the elongated guiding body 60 and the harness 14, it should be understood that the ball joint assembly 88 may be modified to offer only one or two rotational degrees of freedom between the elongated guiding body 60 and the harness 14.

It should also be understood that the ball joint assembly 88 is exemplary only and that the illustrated ball joint assembly 88 may be replaced with an adequate assembly that provides at least one rotational degree of freedom between the elongated guiding body 60 and the harness 14 illustrated in FIG. 8.

It should further be understood that the ball joint assembly 88 may be replaced by any adequate device for fixedly securing the harness 14 to the trolley 80 of the connection structure 62 so that no degree of freedom exists between the harness 14 and the trolley 80.

In one embodiment, a constant force spring may be replaced by another one to adjust the restoring force applied to the connection structure 62. In one embodiment, only a spring is replaced. In another embodiment, the spring assembly 64 comprising the shaft 102, the spacer 104, the bearing 106, the spring 96 and the casing 92 is removed from the base plate 90 and another spring assembly 64 of which the spring 96 is configured for providing a greater or a smaller restoring force. The other spring assembly 64 is then mounted on the base plate 90 and connected to the adapter 120.

In one embodiment, the adapter 120 is fixedly secured to the outer end of the spring 96. In another embodiment, the adapter 120 is removably securable to the outer end of the spring 96 so that the same adapter 120 can be used for connecting different springs 96 to the connection structure 62. To secure the adapter 120 to the spring %, the outer end of the spring % is inserted into the adapter until the hole provided in the outer end of the spring 96 faces the hole provided in the adapter 120 and a fastener such as a screw is inserted into the two facing holes.

In one embodiment, the securing means 84 is a rotating securing device, such as a quick connect adapter, which aligns a spring-loaded pin with the hole in the adapter 120. When the pin and hole are aligned, the spring is released, locking the securing means 84 to the adapter 120. In order to align the pin and the hole together, a rotation of the securing means 84 needs to be performed.

In one embodiment, the weight support device is further provided with at least one sensor. For example, the weight support device may comprise two sensors. The first sensor may be configured for measuring the distance between the bottom of the connection plate 82 and the tube 22 and may be mounted on the tube 22. The distance between the bottom of the connection plate 82 and the tube 22 provides information about the height of the connection plate 82, i.e., about the position of the connection plate 82 relative to the tube 22 along the rail 72. From the height of the connection plate 82, the height of the harness 14 and therefore the user's vertical position can be determined. From the user's vertical position, the user's gait and fatigue can be determined to determine when the user begins to feel muscle fatigue since at this point in time, the user descends in the support. The second sensor may be configured for measuring the distance travelled by the user while using the walker and/or the displacement speed and may be mounted to one of the wheels 30-36, such as on wheel 30 or 32.

In the same embodiment, the weight support device is further provided with a processing unit in communication with the sensor(s). The processing unit is configured for receiving measurement data from the sensor(s) and transmitting the measurement data to a computer machine. In one embodiment, the transmission and/or reception of the data is performed wirelessly. In one embodiment, the processing unit is further configured for performing data processing. For example, the processing unit may be configured for averaging the received measurement data and/or calculating the median of the received measurement data. The processing data may also be configured for correcting the received measurement data by applying mathematical operations, such as additions and/or multiplications, on the received measurement data to correct for biases in the sensor(s). The processing unit may also further be configured for calculated secondary data from the received measurement data. The secondary data may be obtained by applying simple or complex mathematical operations on received measurement data, such as by applying multiplication by constants, integration, derivation, linear and nonlinear functions and matrix algebra on the received measurement data.

In the following, there is described a further embodiment of a walking aid provided with a weight support device. While for the walker 10 the spring assembly 64 is mounted at the top of the U-shaped bar 20 so that the springs are directly connected to the connection body 62, in the above-described walking aid the springs are indirectly connected to the connection body.

FIGS. 11-14 illustrate one embodiment of a walking aid in the shape of a walker 200 provided with a frame 202, a weight support device 204 and a harness 206. It should be understood that the illustrated walker 200 is exemplary only and the weight support device 204 may be used in connection with any other adequate walker, walking aid, treadmill, or the like. As described in greater detail below, the weight support device 204 is mounted to the frame 202 and the harness 206 is mounted to the weight support device 204.

The frame 202 comprises a U-shaped bar or rod 210, a transverse bar 212, two bars 214 and 216, four wheels 220, 222, 224 and 226, two reinforcement arms 228 and 230, and two support arms 232 and 234. The wheels 220 and 222 are rotatably secured to a respective end 242, 244 of the bar 214 while the wheels 224 and 226 are rotatably secured to a respective end 246, 248 of the bar 216.

The U-shaped bar 210 extends between a first end 250 and a second end 252. The first end 250 of the U-shaped bar 210 is mounted to the bar 216 adjacent the end 248 thereof and the second end 252 is mounted to the bar 214 adjacent the end 244 thereof.

The U-shaped bar 210 comprises two straight and parallel portions 260 and 262 connected together by a curved portion 264. The transverse bar 212 longitudinally extends between a first end that is mounted to the straight portion 260 of the U-shaped bar 210, and a second end that is mounted to the straight portion 262 of the U-shaped bar 210. The reinforcement arm 228 extends between a first end secured to the bar 214 at a location located between the two wheels 220 and 222, and a second end secured to the straight portion 260 of the U-shaped bar 210. The reinforcement arm 230 extends between a first end secured to the bar 216 at a location located between the two wheels 224 and 226, and a second end secured to the straight portion 262 of the U-shaped bar 210.

The arm 232 is mounted to the straight portion 260 of the U-shaped bar 210 and projects towards the front side of the walker 200, i.e., towards the wheels 220 and 224. The arm 234 is mounted to the straight portion 262 of the U-shaped bar 210 and projects towards the front side of the walker 200.

The weight support device 204 is mounted to the curved portion 264 of the U-shaped bar 210 and the transverse bar 212. It should be understood that any adequate method/mechanism for mounting the weight support device 204 to the frame may be used. For example, the weight support device 204 may be provided with an aperture for receiving the U-shaped bar 220 therein. In another example, the U-shaped bar 210 may comprise two portions, i.e., a first portion extending between the end 252 and another end secured to the weight support device 204, and a second portion extending between the end 250 and another end secured to the weight support device 204.

In one embodiment, the weight support device 204 is mounted to the frame 102 so that when the walker 200 is deposited on a horizontal surface, the weight support device 204 extends vertically. In one embodiment, such a condition may be achieved when the longitudinal axis of the weight support device 204 is orthogonal to the plane passing by the rotation axes of the wheels 220-228. In this case, the weight support device 204 is said to be mounted vertically so that the force exerted by the weight support device 204 on the harness 206 is vertical, as explained below in greater detail.

As described in greater detail below, the harness 206 is slidably mounted to the weight support device 204.

In operation, the harness 206 is secured to the back of a user and the weight support device 204 supports at least partially the weight of the user. As the user walks, the wheels 220-226 rotate and the walker 200 rolls and follows the user while continuously supporting at least partially the weight of the user.

FIGS. 15-18 illustrate the weight support device 204 in a rest position. The weight support device 204 comprises an elongated body 300 extending along a longitudinal axis and being securable to the transverse bar 212 and the U-shaped bar 210 so that the top portion of the elongated body 300 extends above the U-shaped bar 210.

The elongated body 300 extends longitudinally between a first or bottom end 302 and a second or top end 304 and laterally between a front face 306 and a back face 308. In the illustrated embodiment, the bottom end 302 of the elongated body 300 is mountable to the transverse bar 212 and the top end 304 extends over the U-shaped bar 210 when the elongated body 300 is mounted to the U-shaped bar 210.

The weight support device 204 further comprises a front trolley 320, a spring assembly 322 and a connection assembly 326 mechanically connecting the front trolley 320 and the spring assembly 322 together. The front trolley 320 is movably mounted to the front face 306 of the elongated body 300 so as to move along the longitudinal axis of the elongated body 300. In the illustrated embodiment, a front rail 330 is mounted on the front face 306 of the elongated body 300 and extends along at least a longitudinal section of the elongated body 300 so that the front trolley 320 may slide along the front rail 330.

Figure 16:
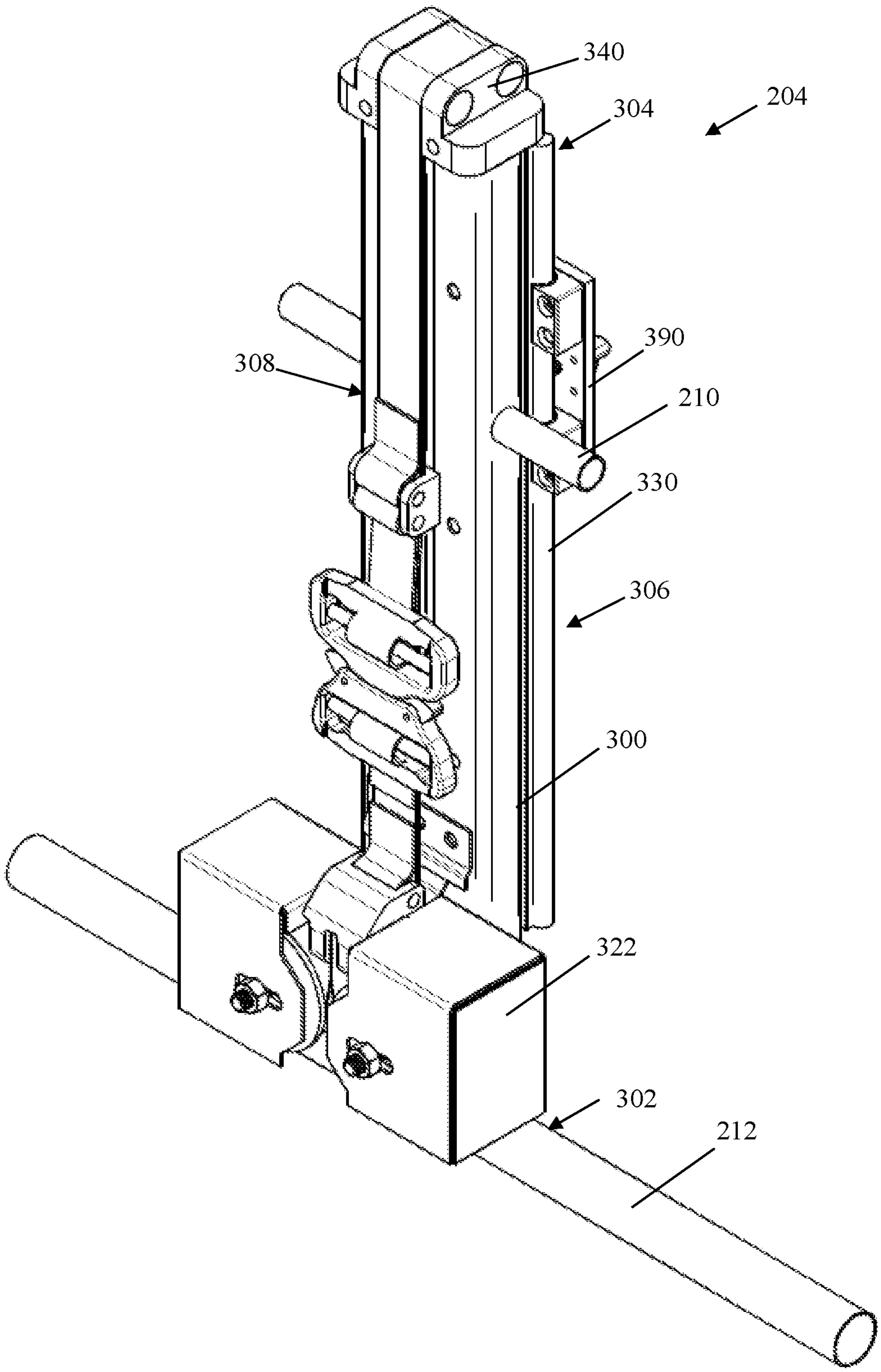
FIG. 16 is a rear perspective view of the weight support device of FIG. 15.
Figure 17:
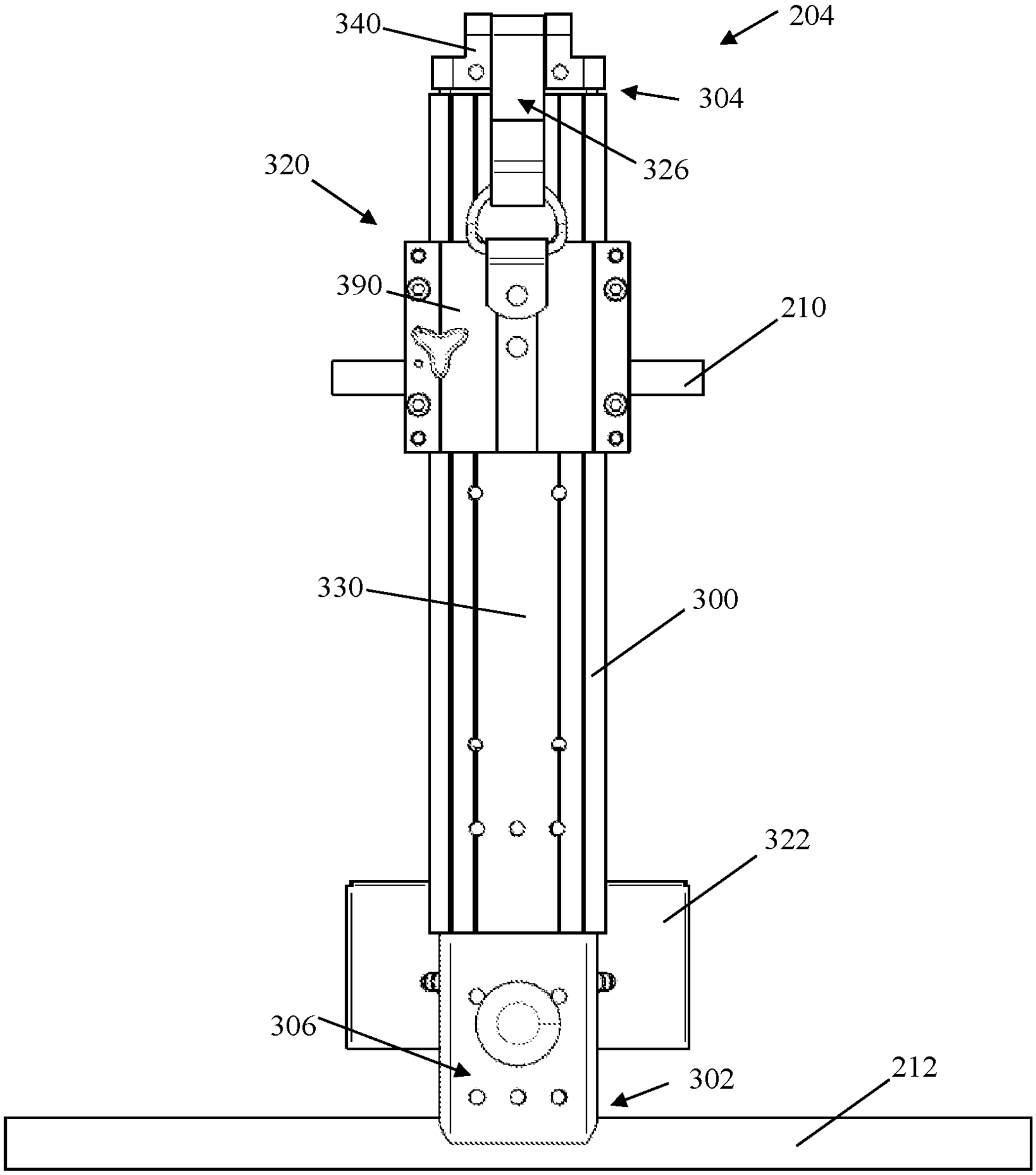
FIG. 17 is a front view of the weight support device of FIG. 15.
Figure 18:
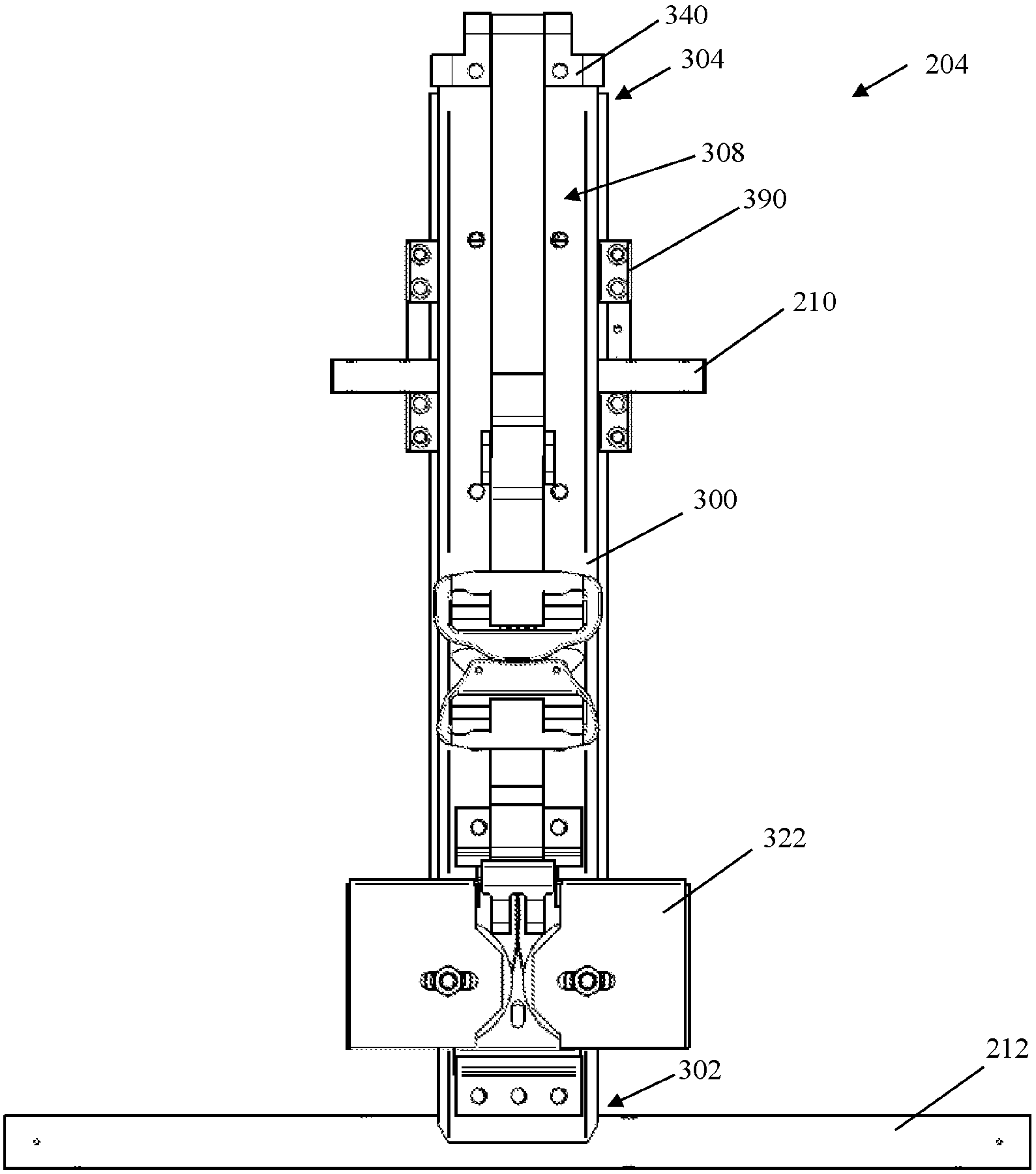
FIG. 18 is a rear view of the weight support device of FIG. 15.
Figure 19:
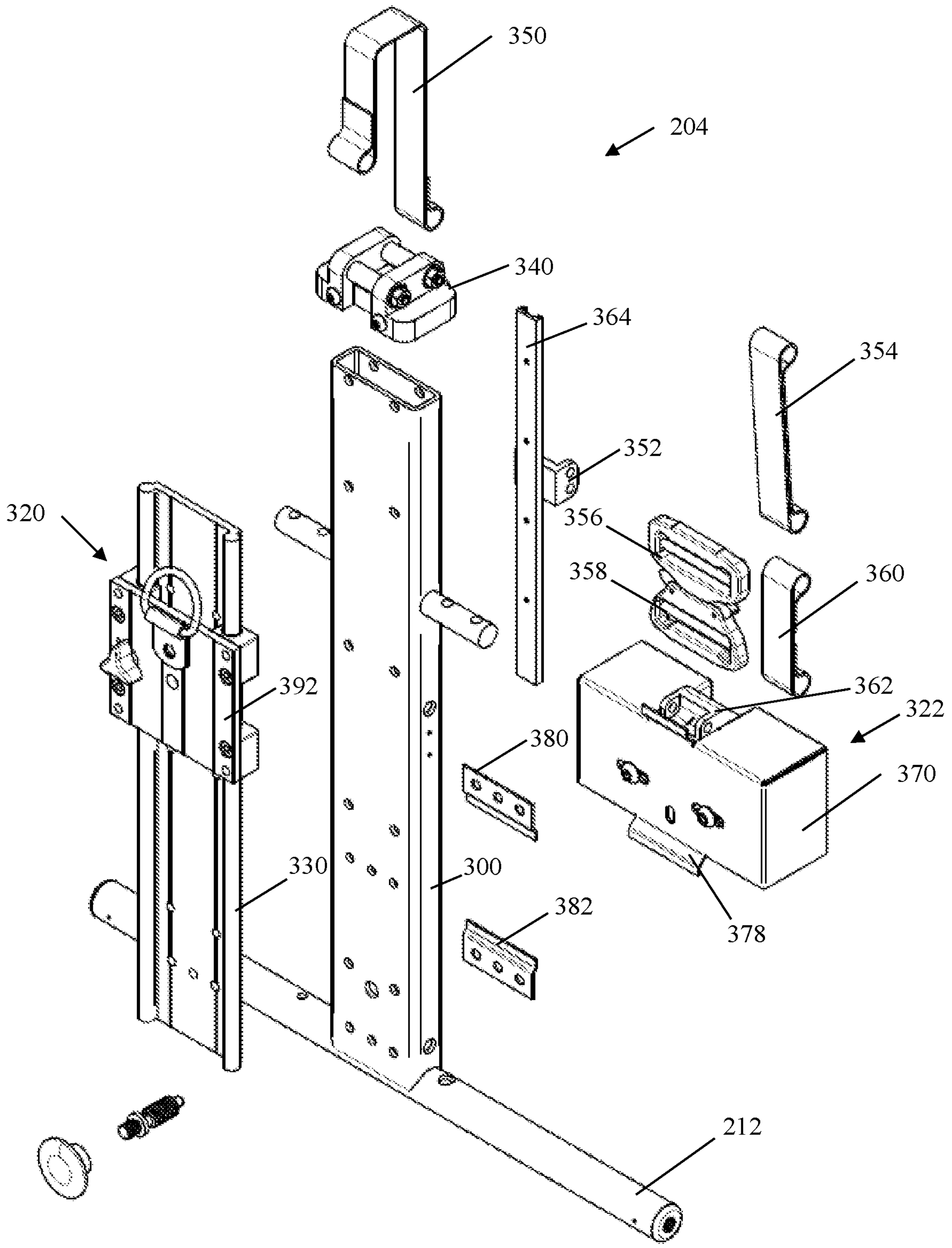
FIG. 19 is a perspective exploded view of the weight support device of FIG. 15.

As illustrated in FIGS. 16 and 18 the spring assembly 322 is mounted to the elongated body 300 on the back face 308 thereof. In the illustrated embodiment, the spring assembly 322 is mounted to the elongated body 300 adjacent the bottom end 302 thereof. However, the person skilled in the art will understand that the spring assembly 322 may be mounted at another location along the length of the elongated body 300.

The connection assembly 326 extends between a first end connected to the front trolley 320 and a second end connected to at least one spring contained into the spring assembly 322. In operation and as described in greater detail below, a translation of the front trolley 320 towards the bottom end 302 of the elongated body 300 triggers an extension of the spring(s) contained in the spring assembly 322. As a result of the extension of the spring(s), a restoring force is applied on the front trolley 320 in a direction opposite to the translation of the front trolley 320, i.e., the restoring force is vertical towards the top end 304 of the elongated body 300. In one embodiment, the connection assembly 326 is provided with a non-extendable length.

A first section of the connection assembly 326 that is secured to the front trolley 320 faces the front face 306 of the elongated body 300. A second section of the connection assembly 326 passes over the top end 304 of the elongated body 300. A third section of the connection assembly 326 is connected to the spring assembly 322 and faces the front face 308 of the elongated body 300.

In the illustrated embodiment, the weight support device 204 comprises a pulley device 340 mounted at the top end 304 of the elongated body 300 and the connection assembly 326 engages the pulley device 340 so as to facilitate the motion of the connection assembly 326 over the top end 304 of the elongated body 300. However, it should be understood that the pulley device 340 may be omitted. In this case, the top end 304 of the elongated body 300 may be provided with a curved shape so as to facilitate the motion of the connection assembly 326 thereover.

It should be understood that at least the portion of the connection assembly 326 that passes over the top end 304 of the elongated body 300 during the translation of the front trolley 320 is flexible. In one embodiment, this portion of the connection assembly 326 is flexible and substantially non-extendable.

In the illustrated embodiment, the connection assembly 326 comprises a first flexible body 350 such as a first belt, strap, or the like, a back trolley 352, a second flexible body 354 such as a second belt, strap, or the like, a first connector 356, a second connector 358, a third flexible body 360 such as a third belt, strap, or the like, and a third connector 362.

The first flexible body 350 is made of a flexible material and extends between a first end connected to the front trolley 320 and a second end mounted to the back trolley 352. A first section of the first flexible body 350 extends from the front trolley 320 to the pulley device 340 facing the front face 306 of the elongated body 300, a second section of the first flexible body 350 engages the pulley device 340, and a third section of the first flexible body 350 extends from the pulley device 340 to the back trolley 352 facing the back face 308 of the elongated body 300.

The back trolley 352 is slidably mounted to the back face 308 of the elongated body and may translate along the longitudinal axis of the elongated body along at least a section thereof. In the illustrated embodiment, the weight support device 204 comprises a rail 364 mounted to the rear face 308 of the elongated body 300. The rail 364 extends longitudinally along the longitudinal axis of the elongated body 300 and along a given section of the length thereof. The back trolley 352 is slidably mounted to rail 364 so as to translate therealong.

The second flexible body 354 is made of a flexible material and extends between a first end connected to the back trolley 352 and a second end secured to the first connector 356. The first and second connectors 356 and 358 are mating connectors, i.e., they are removably securable together.

The third flexible body 362 is made of flexible material and extends between a first end secured to the second connector 358 and a second end secured to the third connector 362 which is secured to the springs as described below.

Figure 20:
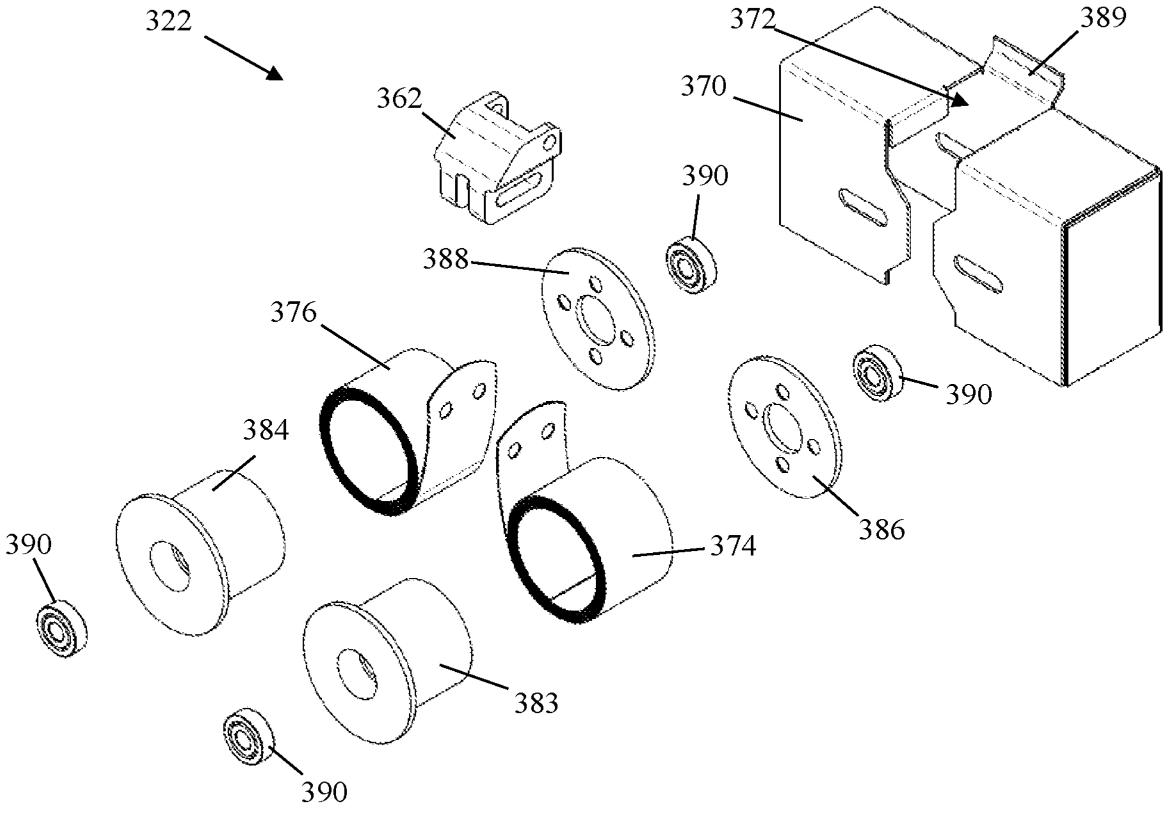
FIG. 20 is a perspective exploded view of a spring assembly contained in the weight support device of FIG. 15, in accordance with an embodiment.
Figure 21:
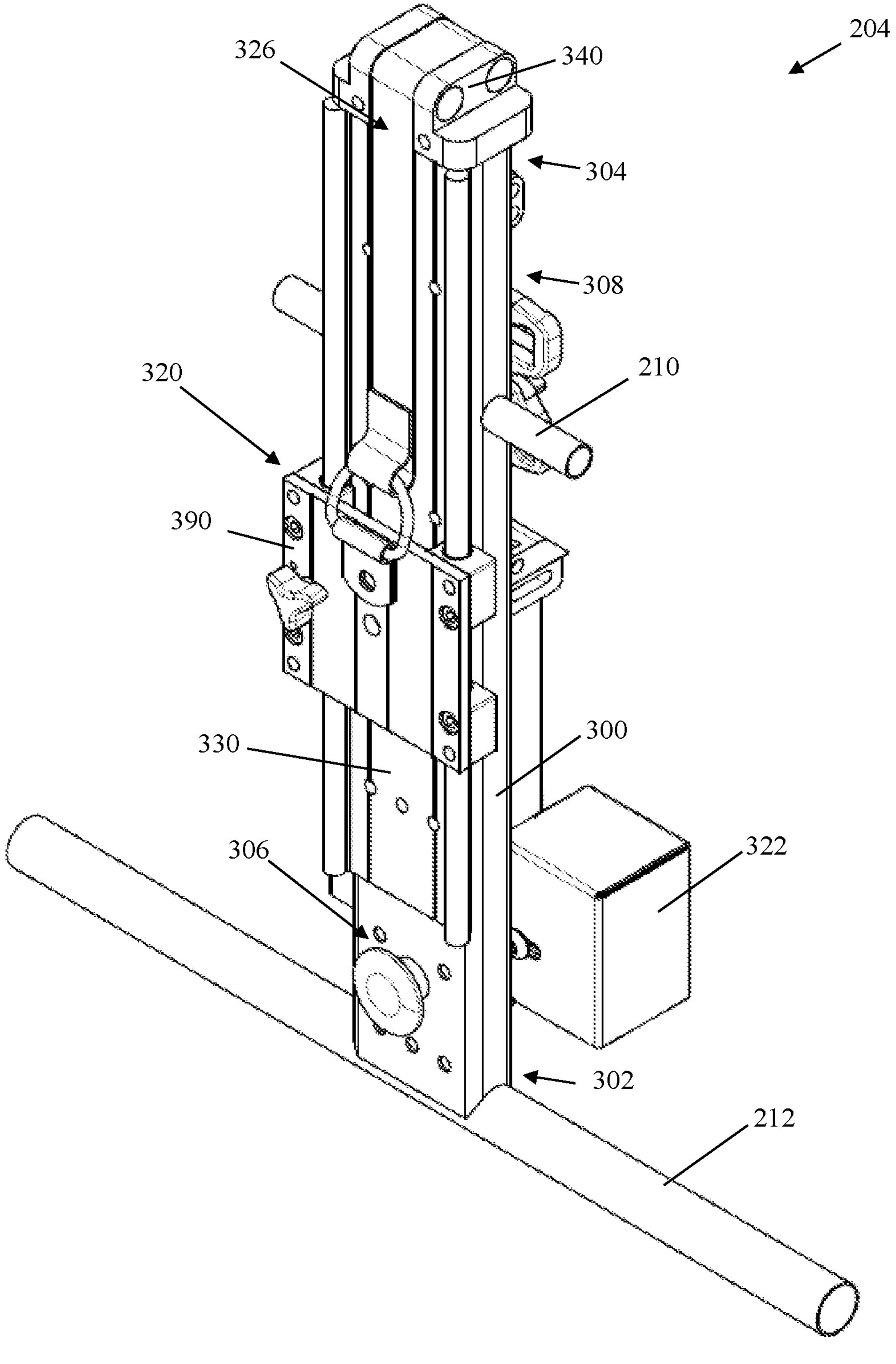
FIG. 21 is a front perspective view of the weight support device of FIG. 15 in an exemplary extended position.

Referring now to FIG. 20, there is illustrated one embodiment of a spring assembly 322. The spring assembly 322 comprising a casing 370 provided with an opening 372 on atop face thereof. Two constant force springs 374 and 376 are rotatable mounted to the casing 370 within the casing 370 and one end of the springs 376 and 387 is secured to the connector 362.

In the illustrated embodiment, the casing 370 is removably securable to the elongated body 330. In this case, the weight support device 204 further comprises two curved plates or brackets 380 and 382 which are secured to the back face 308 of the elongated body and spaced apart so to form a slot therebetween. The casing 370 is further provided with a tongue 378 projecting from a front face thereof and the casing 370 is removable secured to the elongated body 300 by inserting the tongue 378 into the slot defined between the brackets 380 and 382.

In the illustrated embodiment, the spring assembly 322 further comprises spools 383 and 384 on which the constant force springs 374 and 376 are mounted, respectively, and the constant force springs 374 and 376 are fixedly held in place on the spools 383 and 384 thanks to spool caps 386 and 388, respectively. The assemblies formed of the spools 383 and 384, the springs 374 and 376 and the spool caps 386 and 388 are rotatably mounted into the casing 370 via bearings 390. One end of the springs 374 and 376 is fixedly secured to its respective spool 383, 384 and the end of the springs 374 and 376 that projects therefrom is secured to the connector 362. As a result, when a force directed away from the spring assembly 322 is exerted onto the connector 362, the spools 383 and 384 rotate and the springs 374 and 376 are unwound.

Referring back to FIGS. 15-19, when a force directed towards the end 302 of the elongated body 300 is applied on the front trolley 320, the front trolley moves downwards, i.e. towards the end 302 of the elongated body 300. Since the back trolley 352 is connected to the front trolley 320 via the first flexible body 350 and the first flexible body 350 is longitudinally non-extendible, i.e., its length is substantially constant, a downwards translation of the front trolley 320, i.e., a translation of the front trolley towards the end 302 of the elongated body 300, triggers a translation of the back trolley 352 in the opposite direction, i.e., towards the end 304 of the elongated body 300. Since the end of the constant force springs 374 and 376 is secured to the third connector 362, the third connector 362 is connected to the back trolley 352 via the second and third flexible bodies 354 and 360 and the connectors 356 and 358, and the second and third flexible bodies 354 and 360 have substantially constant length, a translation of the back trolley towards the end 304 of the elongated body 300 triggers an unwinding of the springs 374 and 376 which extend partially outside of the casing 70. As a result, the springs 374 and 376 exert a restoring force on the front trolley 320 in a direction opposite to the translation of the front trolley 320, i.e., towards the end 302 of the elongated body 300. The restoring force allows for supporting at least partially the weight of the user.

While FIGS. 15-18 illustrate the weight support device 204 when the front trolley 320, the back trolley 352 and the springs 374 and 376 are each in a rest position, i.e., when no downwards force is applied to the front trolley 320 and the springs are wound, FIGS. 21-24 illustrate the weight support device 204 when the front trolley 320 is an active position, i.e. when a downwards force is exerted on the front trolley 320. When the front trolley 320 is in an active position, the position of the front trolley 320 is located between its rest position and the bottom end of the front rail 330, i.e., the end of the front rail 330 facing the end 302 of the elongated body 300. Similarly, the back trolley 352 is in an active position which is located between its rest position and the top end of the back rail 364, i.e., the end of the back rail 364 facing the end 304 of the elongated position. When the front trolley 320 is in an active position, the springs 374 and 376 are partially unwound and partially extend from the casing 370.

In the illustrated embodiment, the front trolley comprises a connection plate 392 for attachment of the harness 206 thereto. However, it should be understood that any adequate mechanism/method may be used for mounting the harness 206 to the front trolley 320.

Figure 25:
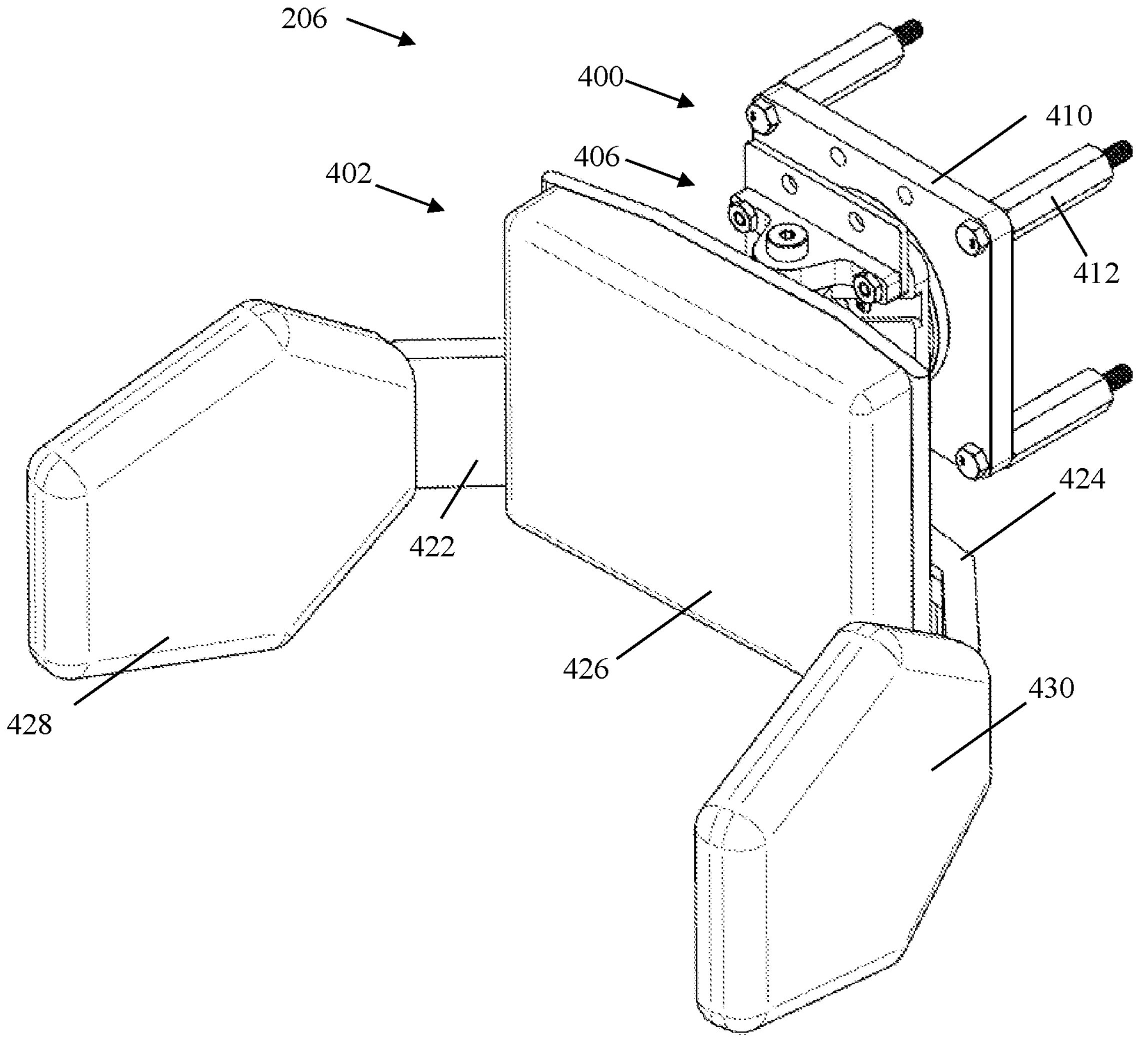
FIG. 25 is a front perspective view of the harness contained in the walker of FIG. 11, in accordance with an embodiment.
Figure 26:
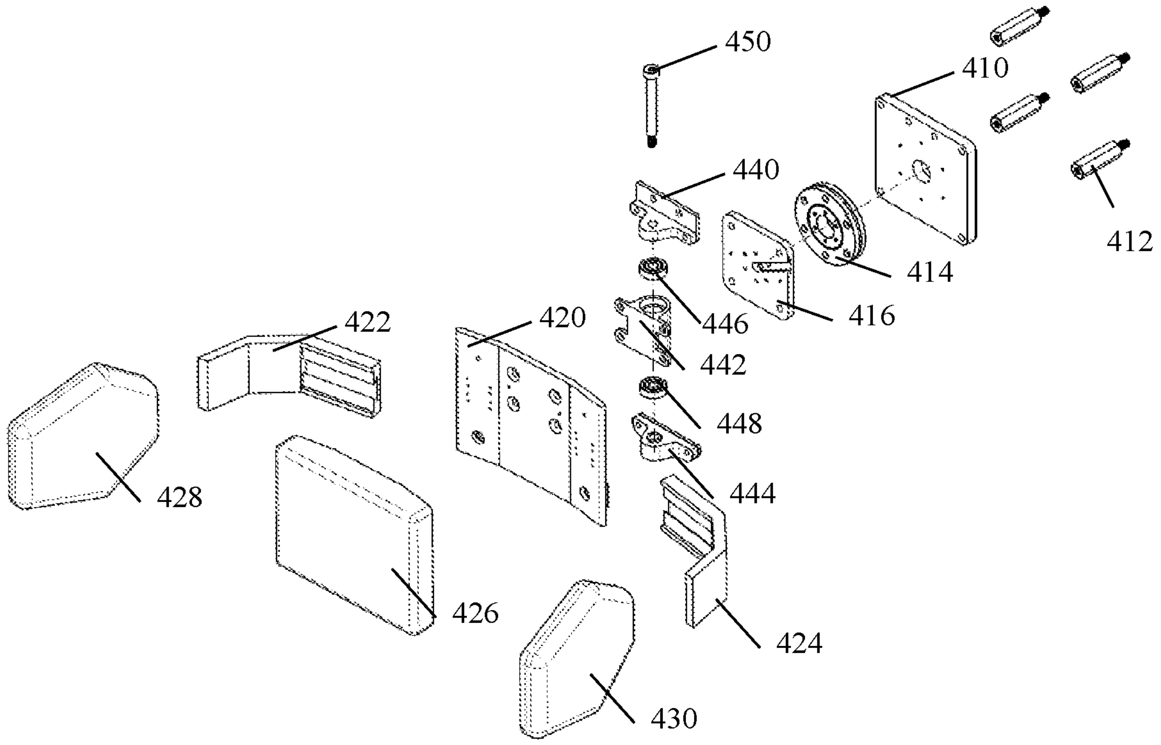
FIG. 26 is an exploded perspective view of the harness of FIG. 25.

FIGS. 25 and 26 illustrate one embodiment of the harness 206 designed and shaped to grip the user's pelvis. The harness 206 comprises a mounting portion 400 and a cushion portion 402 which are pivotally connected together by a pivot assembly 406.

The mounting portion 400 comprises a base plate 410 securable to the connection plate 392 via four standoffs 412 secured to the back of the base plate 410. The mounting portion 400 further comprises a roller bearing 414 and a connection plate 416. The roller bearing 414 is mounted between the front face of the base plate 410 and the back face of the connection plate 416 so that the connection plate may rotate relative to the base plate 410 about a rotation axis orthogonal to the base plate 410.

The cushion portion 402 comprises a central plate 420, two curved arms 422 and 424, a central cushion 426 and two foam covered plates 428 and 430. The central cushion 426 is mounted to the front face of the central plate 420. The arms 422 and 424 are slidably mounted to the back face of the central plate 420 each via a sliding mechanism and they project laterally from a respective lateral side from the central plate 420. As a result, the length of the portion of each arm 422, 424 that projects from the central plate 420 is adjustable. The foam covered plate 428 is secured at the end of the arm 422 that is opposite to the central plate 420 and the foam covered plate 430 is secured at the end of the arm 424 that is opposite to the central plate 420. The cushion 426 is mounted on the front face of the central plate 420.

The pivot assembly 406 is secured to the front face of the connection plate 416 and the back face of the central plate 420. The pivot assembly comprises an upper pivot module 440, a middle pivot module 442, a lower pivot module 444, two bearings 446 and 448 and a shoulder screw 450. Each of the upper, middle and lower pivot modules 440, 442 and 444 is provided with an aperture extending therethrough for receiving the shoulder screw 450 therein. The upper and lower pivot modules 440 and 446 are secured to the front face of the connection plate 416 while the middle pivot module 442 is secured to the back face of the central plate 420 between the upper and lower pivot modules 440. The bearing 446 is mounted between the upper and middle pivot modules 440 and 442 while the bearing 448 is mounted between the middle and lower pivot modules 442 and 444. The pivot modules 440, 442 and 444 and the bearings 446 and 448 are aligned so that their respective apertures are aligned, thereby allowing the insertion of the shoulder screw 450 into the apertures of the different components.

The pivot assembly 406 allows for a rotation of the cushion portion 402 relative to the mounting portion 400 about a rotation axis that is orthogonal to the rotation axis of the roller bearing 414. As a result the cushion portion of the harness 406 may rotate about two rotation axes relative to the front trolley 320, i.e., about a first rotation axis orthogonal to the front face of the connection plate 392 of the front trolley 320 and a second rotation axis orthogonal to the first rotation axis.

In operation, the harness 206 is mounted around the pelvis of the user and the arms 422 and 424 are adjusted so that the harness 206 firmly engages the pelvis of the user. The user may then walk and the walker rolls and follows the user. Furthermore, the weight support device 204 of the walker 200 allows for supporting at least partially the weight of the user as the user walks. When due to the weight of the user, the harness 206 moves downwards, thereby triggering a translation of the front trolley towards the end 302 of the elongated body 330 and the unwinding of the constant force springs 374 and 376, an upward restoring force is exerted on the harness 206 by the constant force springs 374 and 376, thereby allowing a partial support of the weight of the user.

It should be understood that the weight support device 204 may be modified. For example, while it is removably securable to the elongated body 300, the spring assembly 322 may be permanently secured to the elongated body. For example, the casing 370 of the spring assembly 322 may be welded to the elongated body. In this case, the connection assembly may comprise a single flexible body extending between a first end secured to the trolley 320 and a second end secured to springs 374 and 376.

In another example, the connector 352 and the flexible body 354 may be omitted. In this case, the flexible body 350 is directly secured to the connector 356.

It should also be understood that the number of constant force springs may vary as long as the weight support device 204 comprises at least one constant force spring.

In an embodiment in which the spring assembly 322 is removably securable to the elongated body 300, the spring assembly 322, the connector 362, the flexible body 360 and the connector 358 form an interchangeable spring unit. In this case, different interchangeable spring units comprising different springs, i.e., springs capable of generating different restoring forces, can be removably connected to the elongated body 300. For a given user having a given weight, an adequate interchangeable spring unit is chosen based on the restoring force that can be generated by its springs, i.e., the restoring force must be sufficient to at least partially support the weight of the given user. The casing 370 of the adequate interchangeable spring unit is then secured to the elongated body 300 and the connector 358 of the adequate interchangeable spring unit is connected to the connector 356, and the walker 200 may then be used by the given user. If the walker 200 is to be used by another user, another interchangeable spring unit is chosen based on its springs and the weight of the other user, and removably secured to the elongated body as described above.

In one embodiment, the walker 200 is further provided with a data acquisition system for retrieving real-time objective data on the user's rehabilitation by measuring the displacement of the walker 200. The data may include the position of the walker 200 and their speed of movement, as well as the height and orientation of the user's hips. Subsequently, this data can be accessed by the user, a health professional, and/or the like to assess the user's progress and guide the user's training and rehabilitation program.

In one embodiment, the data acquisition system comprises three main subsystems, i.e., sensors, a processing unit and a data transmission unit.

The sensors first make it possible to collect the data by targeting different characteristics of the use of the walker.

In one embodiment, the sensors comprise an orientation sensor, a height sensor, a displacement sensor, and/or at least one pressure sensor.

The orientation sensor is configured for measuring the movements of the user's pelvis. The orientation sensor may comprise a gyroscope secured to the central plate 420 of the walker 200.

The height sensor is configured for measuring the height of the harness and therefore the user's pelvis height. For example, the height sensor may be mounted at the lower end of the rail 330 and be configured to measure the distance between the lower end of the rail 330 and the plate 392 from which the height of the harness, and therefore the user's pelvis height, can be determined. The height of the user's pelvis can then be correlated to the muscular fatigue felt by the user since the latter will tend to sag under the effect of fatigue.

The displacement sensor is configured for measuring the travelled distance, the speed and/or the acceleration of the walker 200. For example, the displacement sensor may comprise a hall effect sensor paired with a magnet mounted to one of the wheels 220-226 so as to measure the number of revolutions of the wheel. This data can be used to calculate the displacement, speed and acceleration of the walker 200, and therefore of the user, in real time.

The pressure sensor(s) is(are) configured to measure the lateral forces applied by the user on the harness and may be inserted into at least one of the plates 428 and 430 and/or into the cushion 426 or behind the cushion 426. As with the data from the orientation sensor, these efforts can make it possible to deduce the movements of the user's pelvis for the purpose of analyzing the gait pattern.

It should be understood that other types of sensors may be integrated into the walker 200.

The processing unit is configured for gathering data from the sensors and stores the data into a memory. The processing unit may be configured to perform different types of operations such as cleaning and correcting data, transforming data into different units, applying algorithms to calculate secondary data, processing data for better presentation to system users, etc. The processing unit may comprise a microcontroller, a microprocessor, a central processing unit, a graphical processing unit, and/or the like.

In one embodiment, the use of at least one constant force spring 96, 374, 376 allows for applying a constant force on the harness 14, 206 independently of the deformation of the constant force spring 96, 374, 376. This allows for offering a constant support to the user over the amplitude of displacement of the trolley 80, 320.

In one embodiment, the wright support device 12, 204 is mounted on the walker 10, 200 so that the elongated body 70, 300 extends vertically when the walker 10, 200 is deposited on a horizontal surface. Such a configuration allows for a vertical translation of the trolley 80, 320, which in turns apply a vertical force on the user that is opposite to gravity. Such a configuration allows for decreasing or substantially eliminating the force components that could induce a loss of balance for the user, thereby increasing the stability of the user. Furthermore, such a configuration allows a substantially constant support for users having different heights.

For example, for the walker 200 in which the wheels 220-226 are identical, the vertical attachment of the elongated body 300 is achieved by having the longitudinal axis of the elongated body 300 being orthogonal to the plane passing by the rotation axes of the wheels 220-226.

In one embodiment, the positioning of the spring assembly 322 at the bottom of the elongated bottom allows for lowering the center of gravity of the walker 200, thereby increasing the stability of the walker.

In one embodiment, the positioning of the spring assembly 322 on the back face of the elongated body 300 allows for moving the spring assembly 322 away from the user, thereby reducing risks of injury for users when the springs 374 and 376 moves out or into the casing 370.

Figure 22:
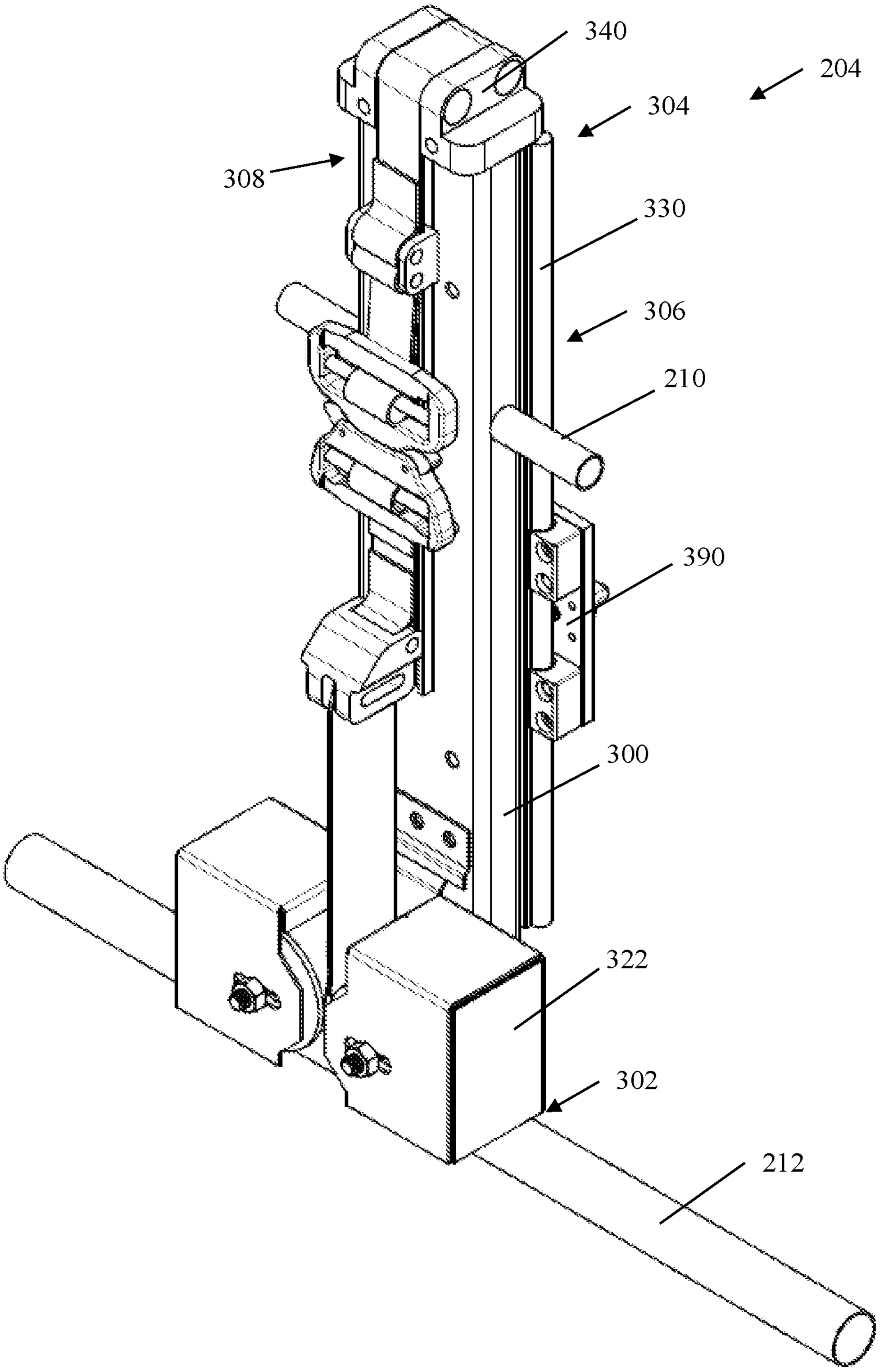
FIG. 22 is a rear perspective view of the weight support device of FIG. 21.
Figure 23:
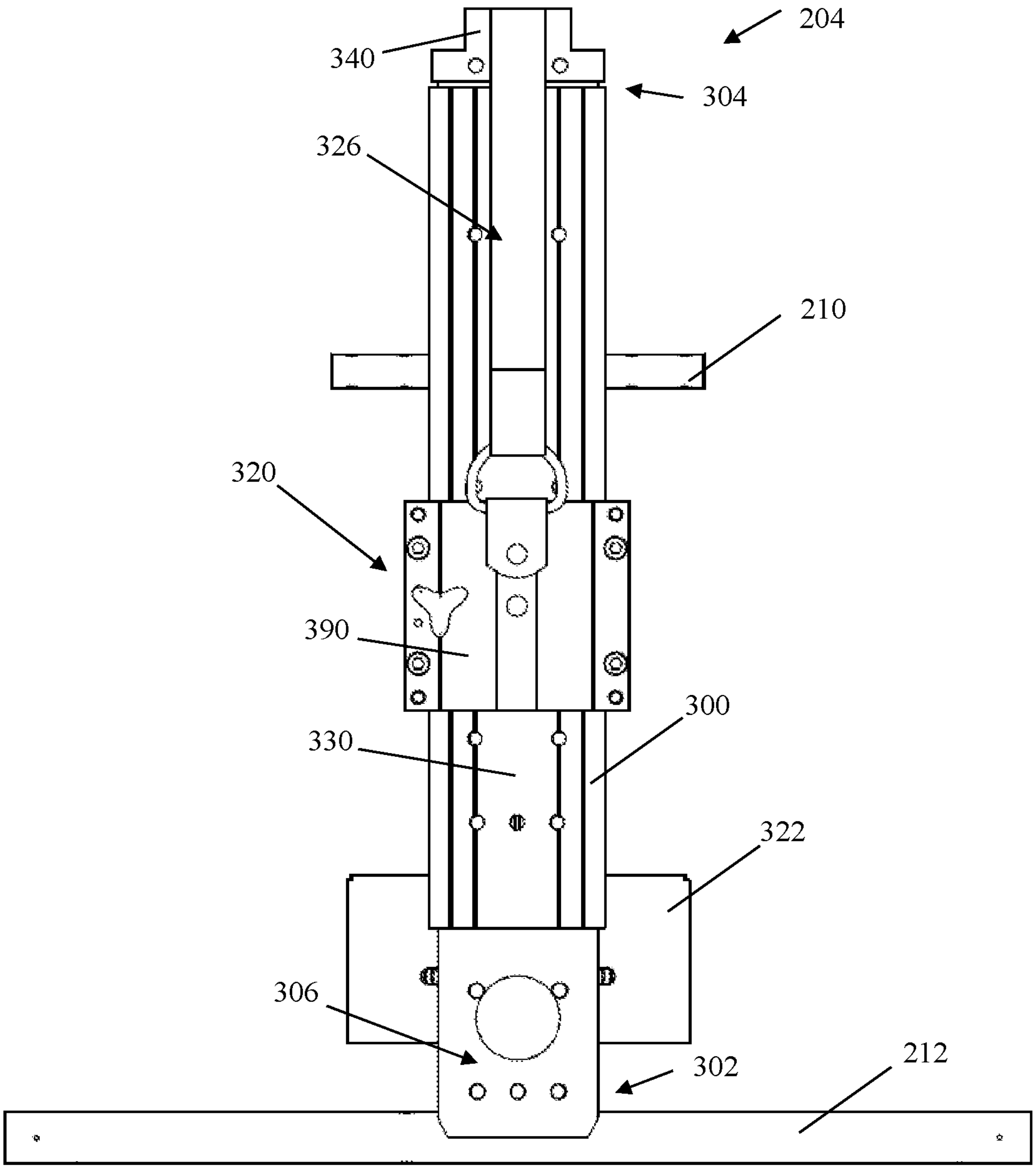
FIG. 23 is a front view of the weight support device of FIG. 21.
Figure 24:
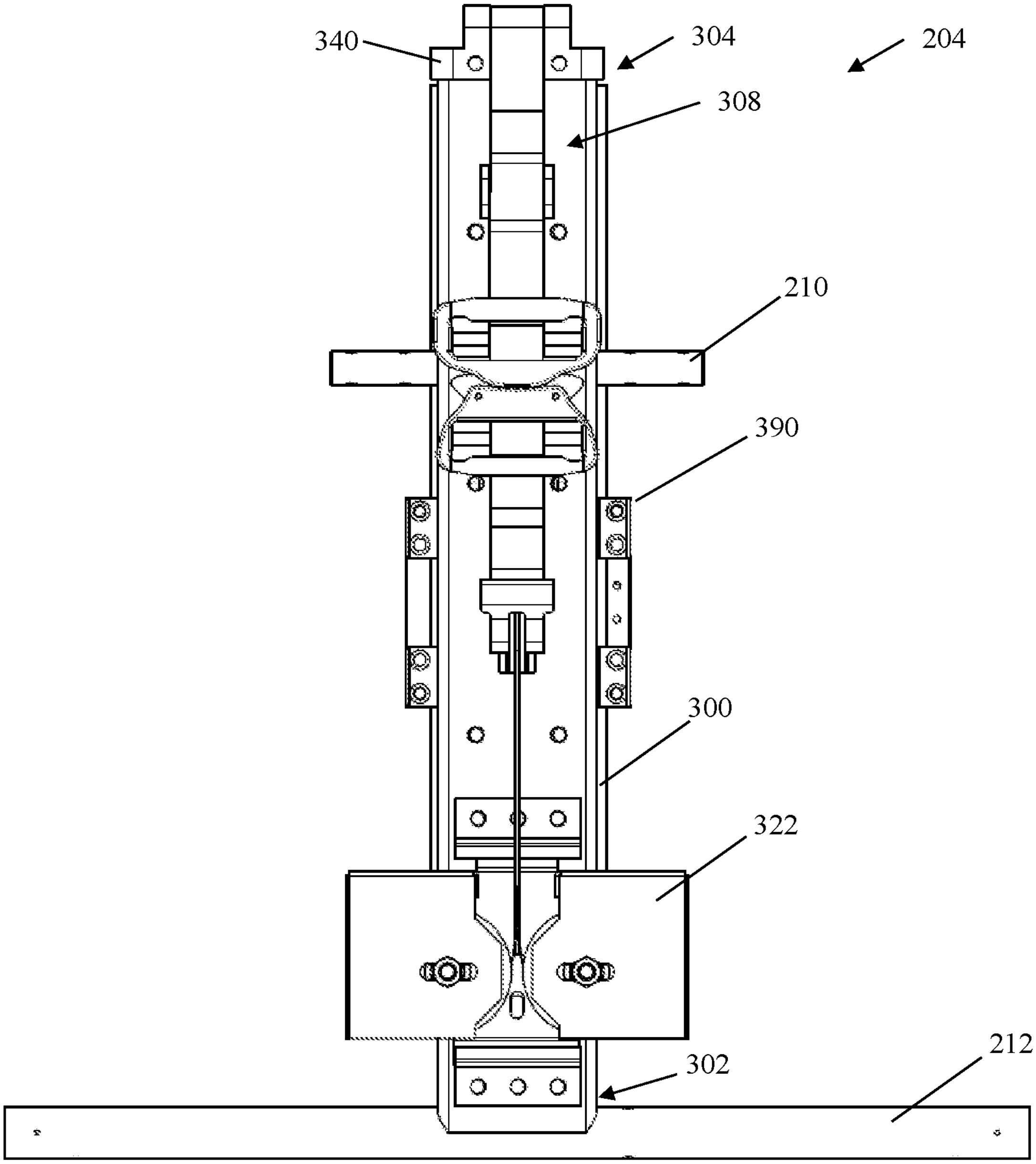
FIG. 24 is a rear view of the weight support device of FIG. 21.

In one embodiment of the spring assembly comprising two constant force springs such as the spring assembly 322, the constant force springs are positioned so that their section that may exit the casing be positioned back to back, as illustrated in FIGS. 22 and 24. Such a configuration allows for improving the performance of the springs. The back to back positioning of the springs allows for decreasing their deformation as they extend from the casing, thereby improving their lifespan, in addition to reducing the space required for accommodating the springs within the casing.

Modifications and improvements to the above-described implementations of the present technology may become apparent to those skilled in the art. The foregoing description is intended to be exemplary rather than limiting.

What is claimed is:

1. A weight support device for use with a walking aid to at least partially support a weight of a user, the weight support device comprising:

an elongated guiding body extending between a first and a second end along a longitudinal axis and laterally between a front face and a rear face, the elongated guiding body being mountable to the walking aid, the longitudinal axis extending substantially vertically when the elongated guiding body is mounted to the walking aid and the walking aid is positioned on a horizontal surface and the first end being higher than the second end when the elongated guiding body is mounted to the walking aid;

a connection body slidably mounted to the elongated guiding body for translating along the longitudinal axis of the elongated guiding body;

at least one constant force spring rotatably mounted to the elongated guiding body, an outer end of the at least one constant force spring being connected to the connection body; and a body securing device for engagement with the user, the body securing device being mounted to the connection body, wherein when the elongated guiding body is mounted to the walking aid, the at least one constant force spring exerts a restoring constant force on the connection body when the connection body moves away from the first end of the elongated guiding body so as to compensate at least partially for the weight of the user.

2. The weight support device of claim 1, wherein the connection body is mounted on the front face of the elongated guiding body.

3. The weight support device of claim 2, wherein the at least one constant force spring is mounted at the first end of the elongated guiding body.

4. The weight support device of claim 3, wherein the outer end of the at least one constant force spring is secured to the connection body.

5. The weight support device of claim 4, wherein the outer end of the at least one constant force spring is removably secured to the connection body.

6. The weight support device of claim 3, wherein the elongated guiding body comprises a rail extending along the longitudinal axis and the connection body comprises a trolley slidably mounted to the rail.

7. The weight support device of claim 6, wherein the connection body further comprises a connection plate mounted to the trolley, the outer end of the at least one constant force spring being connected to the connection plate.

8. The weight support device of claim 1, wherein the connection body comprises a joint assembly securable to the body securing device.

9. The weight support device of claim 2, wherein the at least one constant force spring is mounted on the rear face of the elongated guiding body, the weight support device further comprising a connection assembly extending between a first assembly end connected to the connection body and a second assembly end connected to the outer end of the at least one constant force spring, the connection assembly comprising at least a flexible section to engage the first end of the elongated guiding body.

10. The weight support device of claim 9, wherein the elongated guiding body comprises a front rail extending along the longitudinal axis and the connection body comprises a front trolley slidably mounted to the front rail.

11. The weight support device of claim 10, wherein the connection assembly comprises an elongated flexible body connected between the outer end of the at least one constant force spring and the connection body.

12. The weight support device of claim 10, wherein the connection assembly comprises a first connector and a second connector removably securable together, the first connector being connected to the connection body and the second connector being connected to the outer end of the at least one constant force spring.

13. The weight support device of claim 12, wherein the elongated guiding body comprises a rear rail extending along the longitudinal axis and the connection assembly further comprises a rear trolley slidably mounted to the rear rail, the rear trolley being connected to the connection body and the first connector.

14. The weight support device of claim 10, wherein the front trolley comprises a connection plate.

15. The weight support device of claim 14, wherein the connection body comprises a first rotational connection mounted to the connection plate and a second rotational connection mounted to the first rotational connection, the body securing device being mounted to the second rotational connection.

16. The weight support device of claim 9, wherein the at least one constant force spring is mounted adjacent the second end of the elongated guiding body.

17. The weight support device of claim 1, wherein the body securing device comprises a harness.

18. A walking aid system, comprising:

a walking aid; and a weight support device of claim 1, the weight support device being secured to the walking aid so that the longitudinal axis extends substantially vertically when the walking aid is positioned on the horizontal surface.

19. The walking aid system of claim 18, wherein the walking aid comprises one of a walker and a treadmill.

* * * * *